United States Patent
Hasegawa et al.

(10) Patent No.: US 11,254,791 B2
(45) Date of Patent: Feb. 22, 2022

(54) POLYURETHANE GEL AND PRODUCTION METHOD THEREOF

(71) Applicant: Mitsui Chemicals, Inc., Tokyo (JP)

(72) Inventors: Daisuke Hasegawa, Yokohama (JP); Masakazu Kageoka, Kawasaki (JP); Toshihiko Nakagawa, Ichihara (JP); Goro Kuwamura, Chiba (JP); Hirokazu Morita, Chiba (JP); Satoshi Yamasaki, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 15/742,682

(22) PCT Filed: Jul. 8, 2016

(86) PCT No.: PCT/JP2016/070269
§ 371 (c)(1),
(2) Date: Jan. 8, 2018

(87) PCT Pub. No.: WO2017/010422
PCT Pub. Date: Jan. 19, 2017

(65) Prior Publication Data
US 2018/0208720 A1 Jul. 26, 2018

(30) Foreign Application Priority Data

Jul. 10, 2015 (JP) .............................. JP2015-138568

(51) Int. Cl.
| | |
|---|---|
| *C08J 3/075* | (2006.01) |
| *B32B 27/40* | (2006.01) |
| *C08G 18/10* | (2006.01) |
| *C08G 18/48* | (2006.01) |
| *C08G 18/28* | (2006.01) |
| *C08G 18/73* | (2006.01) |
| *C08G 18/75* | (2006.01) |
| *C08G 18/79* | (2006.01) |
| *C08G 18/24* | (2006.01) |
| *C08G 18/32* | (2006.01) |
| *C08L 75/04* | (2006.01) |

(52) U.S. Cl.
CPC .............. *C08J 3/075* (2013.01); *B32B 27/40* (2013.01); *C08G 18/10* (2013.01); *C08G 18/244* (2013.01); *C08G 18/282* (2013.01); *C08G 18/283* (2013.01); *C08G 18/3206* (2013.01); *C08G 18/4812* (2013.01); *C08G 18/4825* (2013.01); *C08G 18/4829* (2013.01); *C08G 18/4837* (2013.01); *C08G 18/4854* (2013.01); *C08G 18/73* (2013.01); *C08G 18/755* (2013.01); *C08G 18/757* (2013.01); *C08G 18/758* (2013.01); *C08G 18/79* (2013.01); *C08G 18/792* (2013.01); *C08G 18/798* (2013.01); *C08L 75/04* (2013.01); *C08J 2375/04* (2013.01); *C08L 2201/56* (2013.01)

(58) Field of Classification Search
CPC ........ B32B 27/40; C08G 18/79; C08G 18/10; C08G 18/3206; C08G 18/4825; C08G 18/4829; C08G 18/4837; C08G 18/4854; C08G 18/73; C08G 18/755; C08G 18/757; C08G 18/758; C08G 18/792; C08G 18/798; C08G 18/244; C08G 18/282; C08G 18/283; C08G 18/4812; C08J 3/075; C08J 2375/04; C08L 75/04; C08L 2201/56
See application file for complete search history.

(56) References Cited

U.S. PATENT DOCUMENTS

| | | | | |
|---|---|---|---|---|
| 5,656,677 | A * | 8/1997 | Jourquin | C08G 18/161 204/422 |
| 6,534,128 | B1 * | 3/2003 | Carlson | C08G 18/68 427/466 |
| 2002/0123562 | A1 * | 9/2002 | Stender | B05D 7/52 524/589 |
| 2003/0162933 | A1 * | 8/2003 | Hippold | C08F 283/006 528/44 |
| 2010/0216905 | A1 | 8/2010 | Kuwamura | |
| 2011/0133598 | A1 * | 6/2011 | Jenninger | C08G 18/4825 310/311 |
| 2012/0305295 | A1 * | 12/2012 | Kimura | C08G 18/0852 174/254 |
| 2013/0052461 | A1 | 2/2013 | Muta | |
| 2013/0338330 | A1 * | 12/2013 | Nakagawa | C07C 263/10 528/65 |

(Continued)

FOREIGN PATENT DOCUMENTS

| | | |
|---|---|---|
| CN | 1444613 A | 9/2003 |
| CN | 103347852 A | 10/2013 |

(Continued)

OTHER PUBLICATIONS

International Preliminary Report on Patentability dated Sep. 20, 2016 for PCT/JP2016/070269; English Translation.
International Search Report dated Sep. 20, 2016 filed in PCT/JP2016/070269.

*Primary Examiner* — Patrick D Niland
(74) *Attorney, Agent, or Firm* — Rankin, Hill & Clark LLP

(57) ABSTRACT

In a polyurethane gel 1 including a gel layer 2 and a coat layer 3 covering the gel layer 2, the gel layer 2 is produced by allowing at least aliphatic polyisocyanate having an average functionality of more than 2.0 to react with polyol having an average functionality of 3.0 or less, and the coat layer 3 is produced by allowing at least aliphatic diisocyanate and/or alicyclic diisocyanate to react with bifunctional active hydrogen compound.

8 Claims, 2 Drawing Sheets

(56) References Cited

U.S. PATENT DOCUMENTS

| | | | |
|---|---|---|---|
| 2015/0246998 A1* | 9/2015 | Matner | C08G 18/7831 528/53 |
| 2017/0342189 A1 | 11/2017 | Nakagawa | |
| 2017/0342193 A1 | 11/2017 | Nakagawa | |

FOREIGN PATENT DOCUMENTS

| | | |
|---|---|---|
| JP | 2011079985 A | 4/2011 |
| JP | 2013049852 A | 3/2013 |
| JP | 2015010139 A | 1/2015 |
| WO | 2009051114 A1 | 4/2009 |
| WO | 2016098771 A1 | 6/2016 |
| WO | 2016098772 A1 | 6/2016 |

* cited by examiner

1

POLYURETHANE GEL AND PRODUCTION METHOD THEREOF

TECHNICAL FIELD

The present invention relates to a polyurethane gel and a production method thereof.

BACKGROUND ART

Conventionally, in the field of vibration isolation-seismic isolation members, shock absorbents, cushion members, and surface protection members, a low hardness polyurethane gel has been used.

Softness is required for such a polyurethane gel, and therefore usually, a plasticizer is added.

However, disadvantages such as contamination on the polyurethane gel surface may be caused from bleeding of the plasticizer.

Thus, Patent Document 1 below has proposed, for example, as a polyurethane gel containing no plasticizer, a super-low hardness thermosetting polyurethane elastomer-forming composition having an Asker C hardness of 50 or less produced by allowing nurate-type polyisocyanate (A) having an average functionality of 2.5 to 3.5 to react with modified polytetramethyleneglycol (B) having a number average molecular weight of 800 to 5000 so that the equivalent ratio of NCO/OH of (A) to (B) is less than 1.0 (e.g. see Patent Document 1 below).

With the super-low hardness thermosetting polyurethane elastomer-forming composition of Patent Document 1, bleeding of the plasticizer is not caused, but surface tackiness (tack properties) is high, and there are disadvantages in handleability.

Thus, Patent Document 2 has proposed covering a core portion made of polyurethane gel with a surface layer. To be specific, Patent Document 2 has proposed a polyurethane elastomer molded article having a core portion produced by allowing 100 parts by weight of polyoxypolypropylenetriol to react with 6 parts by weight of isophoron diisocyanate; and a surface layer having a thickness of about 1 mm produced by allowing 100 parts by weight of polyoxypolypropylenetriol to react with 12 parts by weight of isophoron diisocyanate (e.g. see Patent Document 2 below).

CITATION LIST

Patent Document

Patent Document 1: Japanese Unexamined Patent Publication No. 2011-79985
Patent Document 2: Japanese Unexamined Patent Publication No. 2015-10139

SUMMARY OF THE INVENTION

Problem to be Solved by the Invention

However, with the polyurethane elastomer molded article of Patent Document 2, practically, mechanical properties and heat resistance may sometimes be insufficient.

To be more specific, examination by the present inventors has revealed problems such as the following. With the embodiment of the gel including alicyclic isocyanate, such as the one in the above-described Patent Document 1, surface tackiness (tack properties) is high, and there are disadvantages in handleability. Providing a coat layer as in the above-described Patent Document 2 does not achieve sufficient surface texture, mechanical properties (elongation at break, etc.), and heat resistance of the molded article including the gel. The examination by the present inventors has also revealed problems such as the following: polyurethane gel produced from bifunctional isocyanate and trihydric polyol component such as the one disclosed in Examples of the above-described Patent Document 2 does not have sufficient mechanical properties (elongation at break, etc.) and heat resistance.

An object of the present invention is to provide a polyurethane gel and a production method thereof, which allows for both improvement in handleability, and improvement in mechanical properties and heat resistance.

Means for Solving the Problem

The present invention includes,

[1] a polyurethane gel including a gel layer and a coat layer covering the gel layer, wherein the gel layer is produced by allowing at least aliphatic polyisocyanate having an average functionality of more than 2.0 to react with polyol having an average functionality of 3.0 or less, the coat layer is produced by allowing at least aliphatic diisocyanate and/or alicyclic diisocyanate to react with bifunctional active hydrogen compound,

[2] the polyurethane gel of [1] above, wherein the aliphatic polyisocyanate having an average functionality of more than 2.0 has an average functionality of 2.5 or more and 4.0 or less,

[3] the polyurethane gel of [1] or [2] above, wherein the aliphatic polyisocyanate having an average functionality of more than 2.0 is an isocyanurate derivative of aliphatic polyisocyanate,

[4] the polyurethane gel of [3] above, wherein the isocyanurate derivative of aliphatic polyisocyanate is an isocyanurate derivative of pentamethylene diisocyanate,

[5] the polyurethane gel of any one of [1] to [4] above, wherein the aliphatic diisocyanate and/or alicyclic diisocyanate are alicyclic diisocyanate,

[6] the polyurethane gel of [5] above, wherein the alicyclic diisocyanate is bis(isocyanatomethyl) cyclohexane,

[7] the polyurethane gel of any one of [1] to [6] above, wherein the polyol having an average functionality of 3.0 or less contains monol,

[8] the polyurethane gel of any one of [1] to [7] above, wherein the coat layer has a thickness of 500 μm or less,

[9] a method for producing a polyurethane gel, the method including producing a gel layer by allowing aliphatic polyisocyanate having an average functionality of more than 2.0 to react with polyol having an average functionality of 3.0 or less, producing a coat layer by allowing aliphatic diisocyanate and/or alicyclic diisocyanate to react with a bifunctional active hydrogen compound, wherein the step of producing a coat layer includes the steps of producing an isocyanate group-terminated prepolymer by allowing the aliphatic diisocyanate and/or alicyclic diisocyanate to react with a portion of the bifunctional active hydrogen compound so that the equivalent ratio of the isocyanate group in the aliphatic diisocyanate and/or alicyclic diisocyanate relative to the active hydrogen group in the portion of the bifunctional active hydrogen compound is more than 1.0, and producing a coat layer by allowing the isocyanate group-terminated prepolymer to react with the remaining portion of the bifunctional active hydrogen compound.

Effects of the Invention

With the polyurethane gel of the present invention, improvement in handleability and improvement in mechanical properties and heat resistance can be achieved both.

Furthermore, with the method for producing a polyurethane gel of the present invention, a polyurethane gel that allows for both improvement in handleability, and improvement in mechanical properties and heat resistance can be produced.

DESCRIPTION OF EMBODIMENTS

Figure 1:
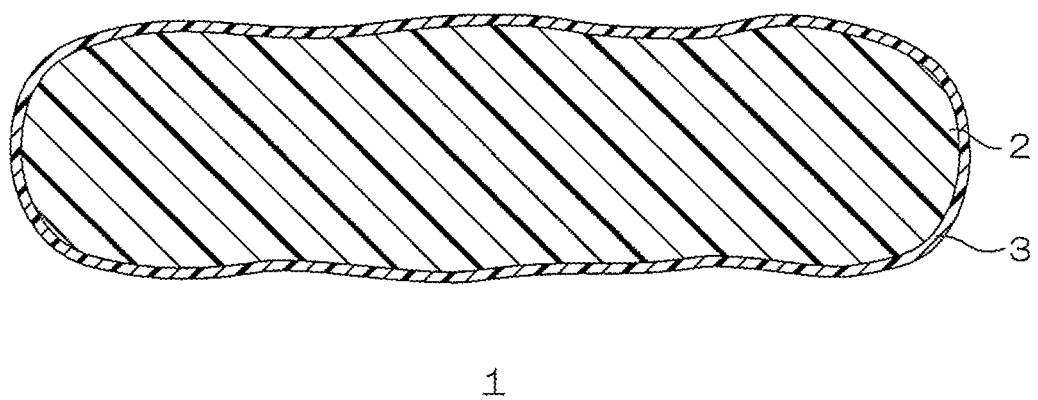
FIG. 1 is a schematic cross-sectional view illustrating an embodiment of the polyurethane gel of the present invention.

In FIG. 1, a polyurethane gel 1 includes a gel layer 2, and a coat layer 3 covering the gel layer 2. The polyurethane gel 1 is composed of, preferably, the gel layer 2 and the coat layer 3.

In FIG. 1, the gel layer 2 has a predetermined thickness, and its entire surface is covered with the coat layer 3 to be described later.

The gel layer 2 is produced by at least allowing aliphatic polyisocyanate having an average functionality of more than 2.0 to read with a polyol having an average functionality of 3.0 or less.

The functional group of the polyisocyanate means the isocyanate group, and the functional group of polyol (including diol) means the hydroxyl group.

Examples of the aliphatic polyisocyanate having an average functionality of more than 2.0 include a derivative of aliphatic diisocyanate (bifunctional monomer), and to be specific, it includes a derivative of aliphatic diisocyanate (aliphatic diisocyanate derivative) produced by modifying aliphatic diisocyanate (bifunctional monomer) to have an average functionality of more than 2.0.

Examples of the aliphatic diisocyanate (bifunctional monomer) include trimethylenediisocyanate, 1,2-propylenediisocyanate, butylenediisocyanate (tetramethylenediisocyanate, 1,2-butylenediisocyanate, 2,3-butylenediisocyanate, 1,3-butylenediisocyanate), pentamethylene diisocyanate (PDI), hexamethylenediisocyanate (HDI), 2,4-, 4- or 2,2,4-trimethylhexamethylenediisocyanate, and 2,6-diisocyanatemethylcaproate.

These aliphatic diisocyanates (bifunctional monomer) may be used singly or in a combination of two or more.

For the aliphatic diisocyanate (bifunctional monomer), in view of improvement in mechanical properties and heat resistance, preferably, pentamethylene diisocyanate (PDI), and hexamethylenediisocyanate (HDI) are used, and furthermore, in view of improvement in texture (softness) and appearance (transparency), more preferably, pentamethylene diisocyanate (PDI) is used.

That is, use of pentamethylene diisocyanate (PDI) for the aliphatic diisocyanate (bifunctional monomer) allows for production of the gel layer 2 having excellent mechanical properties and heat resistance, and furthermore, excellent texture (softness) and appearance (transparency).

The aliphatic diisocyanate derivative can be produced by modifying the above-described aliphatic diisocyanate by a known method.

Examples of the aliphatic diisocyanate derivative include multimers (excluding dimer), an allophanate derivative, biuret derivative, oxadiazinetrione derivative, and uretonimine derivative of aliphatic diisocyanate, and preferably, multimers of aliphatic diisocyanate are used. The aliphatic diisocyanate derivative is preferably prepared in the absence of solvent.

The multimers (excluding dimer) of aliphatic diisocyanate are produced by subjecting aliphatic diisocyanate to multimerization reaction. Examples of the multimers (excluding dimer) of aliphatic diisocyanate include a trimer (e.g., isocyanurate derivative, iminooxadiazinedione derivative, etc.), pentamer, and heptamer, and preferably, trimers are used, more preferably, in isocyanurate derivative is used.

The isocyanurate derivative of aliphatic diisocyanate (aliphatic diisocyanate isocyanurate derivative) can be produced by, for example, subjecting aliphatic diisocyanate to trimerization reaction in the presence of a known isocyanurate-formation catalyst (e.g., N-(2-hydroxypropyl)-N,N,N-trimethylammonium-2-ethylhexanoate, etc.).

The reaction conditions in trimerization reaction are not particularly limited, and are suitably set.

The aliphatic diisocyanate isocyanurate derivative is preferably modified with alcohols. Use of alcohol-modified aliphatic diisocyanate isocyanurate derivative allows for further improvement in mechanical properties and heat resistance.

The alcohols are not particularly limited, and examples thereof include aliphatic alcohol and aromatic alcohol. Preferably, aliphatic alcohol is used. To be specific, examples thereof include monohydric aliphatic alcohols such as methanol, ethanol, n-propanol, isopropanol, n-butanol, isobutanol (also called: isobutyl alcohol), sec-butanol, tert-butanol, pentanol, hexanol, 2-ethylhexanol, octanol, and decanol; dihydric aliphatic alcohols such as ethylene glycol, 1,2-propanediol, 1,3-propanediol, 1,3-butyleneglycol, 1,4-butyleneglycol, 1,5-pentanediol, and 1,6-hexanediol; trihydric aliphatic alcohols such as glycerin and trimethylolpropane; and tetrahydric aliphatic alcohols such as tetramethylolmethane.

Examples of the alcohols also include polyesterpolyol, polyetherpolyol, and polycarbonatepolyol having a molecular weight of 250 to 3000.

These alcohols may be used singly or in a combination of two or more. For the alcohols, preferably, monohydric aliphatic alcohol is used, more preferably, monohydric aliphatic alcohol having 1 to 4 carbon atoms is used, further preferably, isobutanol (also called: isobutyl alcohol) is used.

The aliphatic diisocyanate isocyanurate derivative is modified with alcohols by, for example, the following method. In a method, first, aliphatic diisocyanate is allowed to react with alcohols, and then, isocyanurate-formation reaction is performed in the presence of an isocyanurate-formation catalyst. In another method, for example, first, only aliphatic diisocyanate is subjected to isocyanurate-formation, and then thereafter, the produced polyisocyanurate is allowed to react with alcohols.

Preferably, first, aliphatic diisocyanate is allowed to react with alcohols, and then, isocyanurate-formation reaction is performed in the presence of an isocyanurate-formation catalyst.

In such a reaction, the blending ratio of the aliphatic diisocyanate to alcohol is set suitably in accordance with the purpose and application. For example, relative to 100 parts by mass of aliphatic diisocyanate, alcohol is blended, for example, 0.05 parts by mass or more, preferably 0.1 parts by mass or more, and for example, 10 parts by mass or less, preferably 5 parts by mass or less.

The reaction conditions for the aliphatic diisocyanate and alcohol are set suitably in accordance with the purpose and application.

The reaction of aliphatic diisocyanate with alcohol is urethane-formation reaction and allophanate-formation reaction, and an allophanate derivative of aliphatic diisocyanate may be produced as a by-product. That is, aliphatic diisocyanate isocyanurate derivative modified with alcohol may have an isocyanurate group and an allophanate group in combination.

In such a case, the mole ratio of the allophanate group is smaller than the mole ratio of the isocyanurate group. To be specific, the mole ratio of the allophanate group relative to 1 mol of the isocyanurate group is, for example, 0.05 mol or more, for example, less than 1.0 mol, preferably 0.5 mol or less.

When the mole ratio of the allophanate group is within the above-described range, improvement in mechanical properties and heat resistance can be achieved.

The mole ratio of the allophanate group relative to the isocyanurate group can be determined in conformity with Examples to be described later.

Examples of the aliphatic diisocyanate derivative having an average functionality of more than 2.0 include, in addition to the above-described ones, for example, a polyol modified product of aliphatic diisocyanate (polyol modified aliphatic diisocyanate) (e.g., trimethylolpropane adduct, etc.). However, the polyol modified aliphatic diisocyanate is prepared as a solution, and therefore is not suitable for solventless reaction (bulk polymerization). Therefore, as is described later, when solventless reaction (bulk polymerization) is used in molding of the gel layer 2, preferably, polyol modified aliphatic diisocyanate is not used. That is, polyol modified aliphatic diisocyanate is excluded from the aliphatic diisocyanate derivative having an average functionality of more than 2.0.

The aliphatic polyisocyanate having an average functionality of more than 2.0 may consist only of the above-described aliphatic diisocyanate derivative (preferably, isocyanurate derivative), but for example, the aliphatic polyisocyanate having an average functionality of more than 2.0 may contain an aliphatic diisocyanate derivative having an average functionality of 2.0 or less and the above-described aliphatic diisocyanate (bifunctional monomer) as long as the average functionality of the aliphatic polyisocyanate is more than 2.0

Examples of the aliphatic diisocyanate derivative having an average functionality of 2.0 or less include a uretdione derivative (dimer), urea derivative, and carbodiimide derivative of aliphatic diisocyanate, and preferably, the uretdione derivative of aliphatic diisocyanate (aliphatic diisocyanate uretdione derivative) is used.

The aliphatic diisocyanate uretdione derivative can be produced by a known dimerization reaction, for example, by heating aliphatic diisocyanate under an inert gas atmosphere.

The aliphatic diisocyanate derivative having an average functionality of 2.0 or less (uretdione derivative, etc.) is used by mixing with the aliphatic diisocyanate derivative having an average functionality of more than 2.0 (isocyanurate derivative, etc.).

For example, when the aliphatic diisocyanate uretdione derivative is mixed with the aliphatic diisocyanate isocyanurate derivative, the mixture contains the uretdione group and the isocyanurate group in combination. In such a case, the mole ratio of the uretdione group is smaller than the mole ratio of the isocyanurate group, and to be specific, the uretdione group relative to 1 mol of the isocyanurate group is, for example, 0.05 mol or more, and for example, less than 1.0 mol, preferably 0.5 mol or less.

When the aliphatic diisocyanate derivative having an average functionality of 2.0 or less is mixed with the aliphatic diisocyanate derivative having an average functionality of more than 2.0, the blending ratio is adjusted such that the produced aliphatic polyisocyanate (mixture) has an average functionality of more than 2.0.

To be specific, the aliphatic diisocyanate derivative having an average functionality of 2.0 or less is blended in an amount of, for example, 1 part by mass or more, preferably 5 parts by mass or more, and for example, 60 parts by mass or less, preferably 30 parts by mass or less relative to 100 parts by mass of a total amount of the aliphatic diisocyanate derivative having an average functionality of 2.0 or less and the aliphatic diisocyanate derivative having an average functionality of more than 2.0. The aliphatic diisocyanate derivative having an average functionality of more than 2.0 is blended in an amount of, for example, 40 parts by mass or more, preferably 70 parts by mass or more, and for example, 99 parts by mass or less, preferably 95 parts by mass or less.

The aliphatic polyisocyanate having an average functionality of more than 2.0 may contain, as necessary, an aliphatic polyisocyanate monomer having a functionality of three or more.

Examples of the aliphatic polyisocyanate monomer having a functionality of three or more include aliphatic triisocyanates such as 1,6,11-undecamethylenetriisocyanate, 1,3,6-hexamethylenetriisocyanate, 1,8-diisocyanate-4-isocyanatomethyloctane, 2,5,7-trimethyl-1,8-diisocyanate-5-isocyanatomethylocatane, and lysinetriisocyanate.

When these aliphatic polyisocyanate monomers having a functionality of three or more are used, the content is set suitably in accordance with the purpose and application.

In view of improvement in mechanical properties and heat resistance, the aliphatic polyisocyanate having an average functionality of more than 2.0 preferably consists of the aliphatic diisocyanate derivative having an average functionality of more than 2.0, more preferably, consists of the aliphatic diisocyanate isocyanurate derivative, even more preferably, consists of an isocyanurate derivative of pentamethylene diisocyanate (however, it is allowed to contain allophanate derivative and uretdione derivative by-produced at the time of isocyanurate derivative production).

The aliphatic polyisocyanate having an average functionality of more than 2.0 has an average functionality of preferably 2.5 or more preferably 2.8 or more, even more preferably 3.0 or more, and for example, 5.0 or less, preferably 4.0 or less, more preferably 3.5 or less, even more preferably 3.3 or less.

The average functionality of the aliphatic polyisocyanate is calculated in conformity with Examples described later.

The aliphatic polyisocyanate having an average functionality of more than 2.0 has an isocyanate group concentration of, for example, 20.0 mass % or more, preferably 24.0 mass % or more, and for example, 30.0 mass % or less, preferably 25.0 mass % or less, more preferably 24.6 mass % or less.

As the polyol having an average functionality of 3.0 or less, a high-molecular weight polyol having an average functionality of 3.0 or less, or a low-molecular-weight polyol having an average functionality of 3.0 or less is used singly. Alternatively, the high-molecular weight polyol and/or the low-molecular-weight polyol mixed so that the average functionality thereof is 3.0 or less is used.

The high-molecular weight polyol is a compound having two or more hydroxyl groups and having a number average molecular weight of 400 or more, and generally 10000 or less, and examples thereof include polyetherpolyol, polyesterpolyol, polyesteramidepolyol, polycarbonatepolyol, polyurethane polyol, epoxypolyol, vegetable oil polyol, polyolefin polyol, acrylic polyol, and vinyl monomer-modified polyol, and preferably, polyetherpolyol, polyesterpolyol, polycarbonatepolyol, and polyurethane polyol are used.

Examples of the polyetherpolyol include polyoxyalkylene polyol, polytetramethylene ether glycol, and polytrimethylene ether glycol.

Examples of the polyoxyalkylene polyol include an addition polymerization product (including random and/or block copolymer of two or more types of alkylene oxides) of alkylene oxides such as ethylene oxide and propylene oxide using a low-molecular-weight polyol described later or aromatic/aliphatic polyamine as an initiator. The functionality of polyoxyalkylene polyol is determined in accordance with the functionality of the initiator. For example, when the initiator having a functionality of two is used, polyoxyalkylenediol having an average functionality of two is produced, and when the initiator having a functionality of three is used, polyoxyalkylenetriol having an average functionality of three is produced.

Examples of the polytetramethylene ether glycol include a ring-opening polymerization product produced by cationic polymerization of tetrahydrofuran, and noncrystalline polytetramethylene ether glycol (average functionality 2) produced by copolymerizing a polymerization unit of tetrahydrofuran with dihydric alcohol described later. Noncrystalline means that it is liquid under normal temperature (25° C.)

Noncrystalline polytetramethylene ether glycol can be produced as a copolymer (tetrahydrofuran/alkyl-substituted tetrahydrofuran (molar ratio)=15/85 to 85/15, number average molecular weight 500 to 4000, preferably 800 to 2500) of tetrahydrofuran and alkyl-substituted tetrahydrofuran (e.g., 3-methyltetrahydrofuran, etc.), and a copolymer of tetrahydrofuran and branched glycol (e.g., neopentyl glycol, etc.) (tetrahydrofuran/branched glycol (molar ration)=15/85 to 85/15, number average molecular weight 500 to 4000, preferably 800 to 2500).

Examples of the noncrystalline polytetramethylene ether glycol include a commercially available product, and examples of the commercially available product include "PTXG" series manufactured by Asahi Kasei Corporation, and "PTG-L" series manufactured by Hodogaya Chemical Co., Ltd.

Furthermore, plant derived polytetramethylene ether glycol using tetrahydrofuran produced from a plant derived material such as furfural as a starting material can also be used.

Examples of the polytrimethylene ether glycol include polyol produced from polycondensation of plant derived 1,3-propanediol.

Examples of the polyesterpolyol include a polycondensate produced by allowing the low-molecular-weight polyol (preferably dihydric alcohol) to be described later to react with polybasic acid under known conditions.

Examples of the polybasic acid include saturated aliphatic dicarboxylic acids such as oxalic acid, malonic acid, succinic acid, methylsuccinic acid, glutaric acid, adipic acid, 1,1-dimethyl-1,3-dicarboxypropane, 3-methyl-3-ethylglutaric acid, azelaic acid, sebacic acid, saturated aliphatic dicarboxylic acids (C11 to 13), etc.; unsaturated aliphatic dicarboxylic acids such as maleic acid, fumaric acid, itaconic acid, etc.; aromatic dicarboxylic acids such as orthophthalic acid, isophthalic acid, terephthalic acid, toluenedicarboxylic acid, naphthalenedicarboxylic acid, etc.; alicyclic dicarboxylic acids such as hexahydrophthalic acid, etc.; other carboxylic acids such as dimer acid, hydrogenated dimer acid, het acid, etc. and acid anhydrides derived from these carboxylic acids such as oxalic anhydride, succinic anhydride, maleic anhydride, phthalic anhydride, 2-alkyl (C12 to 18) succinic anhydride, tetrahydrophthalic anhydride, trimellitic anhydride, and hallides derived from carboxylic acids thereof such as oxalyl dichloride, adipoyl dichloride, and sebacoyl dichloride.

Examples of the polyester polyol include vegetable oil polyester polyols obtained by condensation reaction of hydroxycarboxylic acid such as hydroxyl group-containing vegetable oil fatty acid (e.g., castor oil fatty acid containing ricinoleic acid, hydrogenated castor oil fatty acid containing 12-hydroxystearic acid, etc.) with the low-molecular-weight polyol to be described later under known conditions.

Examples of the polyester polyol further include lactone-based polyester polyols such as polycaprolactone polyol and polyvalerolactone polyol obtained by ring-opening polymerization of lactones such as ε-caprolactone, γ-valerolactone, etc. using the low-molecular-weight polyols (preferably, dihydric alcohol) to be described later as an initiator; and copolymer of a polycaprolactone polyol or polyvalerolactone polyol with dihydric alcohol to be described later.

Examples of the polycarbonatepolyol include a ring-opening polymerization product of ethylenecarbonate using the low-molecular-weight polyol (preferably, dihydric alcohol) to be described later as an initiator, and noncrystalline polycarbonatepolyol produced by copolymerizing a ring-opening polymerization product wish dihydric alcohols such as 1,4-butanediol, 1,5-pentanediol, 3-methyl-1,5-pentanediol,and 1,6-hexanediol.

Examples of the polycarbonate polyol include plant derived polycarbonate polyols, to be specific, polycarbonate polyol produced by transesterification of alicyclic dihydroxy compounds such as isosorbide derived from glucose, i.e., a plant derived material, or the low molecular-weight polyol to be described later with diphenyl carbonate.

The polyurethane polyol can be produced as polyesterpolyurethane polyol, polyetherpolyurethane polyol, polycarbonatepolyurethane polyol, or polyesterpolyetherpolyurethane polyol by allowing polyesterpolyol, polyetherpolyol and/or polycarbonatepolyol obtained as described above to react with a known polyisocyanate so that the equivalent ratio (OH/NCO) of the hydroxyl group relative to the isocyanate group is more than 1.

These high-molecular weight polyols may be used singly or in a combination of two or more.

For the high-molecular weight polyol, in view of decreasing tack properties and improvement in mechanical properties and heat resistance, preferably, polyetherpolyol is used, more preferably, polytetramethylene ether glycol is used.

For the high-molecular weight polyol, preferably, in view of improvement in texture (softness) and appearance (transparency), preferably, noncrystalline high-molecular weight polyol is used, more preferably, noncrystalline polyetherpolyol is used.

For the high-molecular weight polyol, in view of improvement in mechanical properties and heat resistance and also in view of improvement in texture (softness) and appearance (transparency), particularly preferably, noncrystalline polytetramethylene ether glycol is used.

The low-molecular-weight polyol is a compound having two or more hydroxyl groups and having a number average molecular weight of 60 or more and less than 400, and examples thereof include dihydric alcohols such as ethylene glycol, propylene glycol, 1,3-propanediol, 1,4-butyleneglycol, 1,3-butyleneglycol, 1,2-butyleneglycol, 1,5-pentanediol, 1,6-hexanediol, neopentyl glycol, 3-methyl-1,5-pentanediol, 2,2,2-trimethylpentanediol, 3,3-dimethylolheptane, alkane (C7 to 20) diol, 1,3- or 1,4-cyclohexanedimethanol and a mixture thereof, 1,3- or 1,4-cyclohexanediol and a mixture thereof, hydrogenated bisphenol A, 1,4-dihydroxy-2-butene, 2,6-dimethyl-1-octene-3,8-diol, bisphenol A, diethylene glycol, triethylene glycol, and dipropylene glycol; trihydric alcohols such as glycerin, trimethylolpropane, and triisopropanolamine; tetrahydric alcohols such as tetramethylolmethane (pentaerythritol) and diglycerin; pentahydric alcohols such as xylitol; hexahydric alcohols such as sorbitol, mannitol, allitol, iditol, dulcitol, altritol, inositol, and dipentaerythritol; heptahydric alcohols such as perseitol; and octahydric alcohols such as sucrose.

These low-molecular-weight polyols may be used singly or in a combination of two or more.

For the polyol having an average functionality of 3.0 or less, as described above, a high-molecular weight polyol having an average functionality of 3.0 or less, or a low-molecular-weight polyol having an average functionality of 3.0 or less is used singly, or, for example, the high-molecular weight polyol and/or low-molecular-weight polyol are mixed so that the mixture has an average functionality of 3.0 or less, and the mixture is used.

When the high-molecular weight polyol and/or low-molecular-weight polyol are mixed, their blending ratios are suitably set so that the mixture has an average functionality of 3.0 or less.

The polyol may contain monol (monohydric alcohol).

When the polyol contains monol, a gel layer 2 with excellent mechanical properties such as softness can be produced.

Examples of the monol (monohydric alcohol) include methanol, ethanol, propanol, isopropanol, butanol, isobutanol, s-butanol, t-butanol, pentanol, hexanol, heptanol, octanol, nonanol, decanol, undecanol, dodecanol, tridecanol, tetradecanol, hexadecanol (1-hexadecanol, etc.), heptadecanol, octadecanol (1-octadecanol, etc.), nonadecanol, eicosanol (1-eicosanol, etc.), tetracosanol (1-tetracosanol, etc.), and isomers thereof, and furthermore, other alkanol (C20 to 50 alcohol); alkenylacohols such as oleylalcohol and linoleyl alcohol; and aliphatic monol such as alkadienol including octadienol. Examples of the monol also include alicyclic monols such as cyclohexanol and methylcyclohexanol; and araliphatic monols such as benzylalcohol.

Examples of the monol also include monoalkylester in which a hydroxyl group at one terminal of the above-described high-molecular weight polyol is replaced with an alkylester group, and monoalkylether (e.g., polyoxyethylenemonoalkylether, etc.) in which a hydroxyl group at one terminal of the above-described high-molecular weight polyol is replaced with an alkylether group.

These monols may be used singly or in a combination of two or more.

The amount of the monol blended is set suitably in accordance with the purpose and application, but in view of improvement in mechanical properties, the monol is blended in an amount relative to a total amount of the polyol of, for example, 1 mass % or more, preferably 2 mass % or more, and for example, 40 mass % or less, preferably 30 mass % or less.

For the polyol, in view of improvement in texture (softness), preferably, a high-molecular weight polyol having an average functionality of 3.0 or less is used, more preferably, a high-molecular weight polyol having an average functionality of 2.0 is used.

For the polyol, preferably, noncrystalline high-molecular weight polyol is used, more preferably, noncrystalline polyetherpolyol is used, and more preferably, noncrystalline polytetramethylene ether glycol (average functionality 2) is used.

When noncrystalline polytetramethylene ether glycol is used as the polyol, improvement in mechanical properties and heat resistance can be achieved.

The polyol has an average functionality of 3.0 or less, preferably 2.5 or less, and a preferable lower limit is 1.8 or more, more preferably 2.0 or more. The polyol has an average functionality of particularly preferably 2.0.

The polyol has an average hydroxyl number (OH value) of, for example, 10 mgKOH/g or more, preferably 12 mgKOH/g or more, more preferably 15 mgKOH/g or more, for example, 150 mgKOH/g or less, preferably 120 mgKOH/g or less, more preferably 100 mgKOH/g or less.

The average functionality of polyol is calculated from the amount charged in the mixing formulation, and the hydroxyl number of polyol is measured in conformity with JIS K 1557-1 (2007).

To produce the gel layer 2, preferably, aliphatic polyisocyanate having an average functionality of more than 2.0 and polyol having an average functionality of 3.0 or less are subjected to urethane-formation reaction (solventless reaction, bulk polymerization) in a predetermined mold preferably without the presence of solvent.

In the urethane-formation reaction, for example, a known process such as one shot process and prepolymer process are used, and preferably, one shot process is used.

In one shot process, for example, aliphatic polyisocyanate having an average functionality of more than 2.0 and polyol having an average functionality of 3.0 or less are formulated (mixed) so that the equivalent ratio (NCO/active hydrogen group) of the isocyanate group in the aliphatic polyisocyanate relative to the active hydrogen group (hydroxyl group) in polyol is, for example, 0.2 or more, preferably 0.4 or more, and for example, 0.8 or less, preferably 0.7 or less, and thereafter, the mixture is subjected to curing reaction at, for example, room temperature to 120° C., preferably, room temperature to 100° C. for, for example, 5 minutes to 72 hours, preferably 2 to 10 hours. The curing temperature can be a constant temperature, or can be increased or decreased stepwise.

In the above-described reaction, as necessary, for example, a known urethane-formation catalyst such as amines and organic metal compounds can be added.

Examples of the amines include tertiary amines such as triethylamine, triethylenediamine, bis-(2-dimethylaminoethyl) ether, N-methylmorpholine, quaternary ammonium salts such as tetraethylhydroxylammonium, and imidazoles such as imidazole and 2-ethyl-4-methylimidazole.

Examples of the organic metal compound include organic tin compounds such as tin acetate, tin octylate, tin oleate, tin laurate, dibutyltin diacetate, dimethyltin dilaurate, dibutyltin dilaurate, dibutyltin dimercaptide, dibutyltin maleate, dibutyltin dilaurate (dibutyl tin (IV) dilaurate), dibutyltin dineodecanoate, dioctyltin dimercaptide, dioctyltin dilaurate, and dibutyltin dichloride; organic lead compounds such as lead octoate and lead naphthenate; organic nickel compounds such as nickel naphthenate; organic cobalt compounds such as cobalt naphthenate; organic copper compounds such as copper octenate; and organic bismuth compounds such as bismuth octylate and bismuth neodecanoate.

Examples of the urethane-formation catalyst further include potassium salts such as potassium carbonate, potassium acetate, and potassium octylate.

These urethane-formation catalysts may be used singly or in a combination of two or more.

For the urethane-formation catalyst, preferably, the organic metal compound is used, and more preferably, the organic tin compound is used, and even more preferably, dibutyltin dilaurate (dibutyl tin (IV) dilaurate) is used.

The urethane-formation catalyst can be added at any time without any particular limitation, and for example, the methane-formation catalyst can be added in advance to both or one of the aliphatic polyisocyanate having an average functionality of more than 2.0 and polyol having an average functionality of 3.0 or less. Alternatively, the urethane-formation catalyst can be added at the same time when aliphatic polyisocyanate having an average functionality of more than 2.0 and polyol having an average functionality of 3.0 or less are blended. Furthermore, the methane-formation catalyst can be added separately after blending the aliphatic polyisocyanate having an average functionality of more than 2.0 and polyol having an average functionality of 3.0 or less.

The amount of the urethane-formation catalyst to be added is not particularly limited, and is set suitably in accordance with the purpose and application.

In the above-described reaction, as necessary, a known additive such as a storage stabilizer (o-toluenesulfonamide, p-toluenesulfonamide, etc.), anti-blocking agent, heat-resistant stabilizer, light stabilizer, ultraviolet ray absorber, antioxidant, antifoaming agent, release agent, pigment, dye, lubricant, filler, and hydrolysis inhibitor can be further added in a suitable amount.

The additives can be added at any time without particular limitation, and for example, the additives can be added in advance to both or one of the aliphatic polyisocyanate having an average functionality of more than 2.0, and polyol having an average functionality of 3.0 or less. Alternatively, the additives can be added at the same time when the aliphatic polyisocyanate having an average functionality of more than 2.0, and polyol having an average functionality of 3.0 or less are blended. Furthermore, the additives can be added separately after the aliphatic polyisocyanate having an average functionality of more than 2.0, and polyol having an average functionality of 3.0 or less are blended. The amount of the additives added is not particularly limited, and is set suitably in accordance with the purpose and application.

When a plasticizer is added in the above-described reaction, bleeding may be caused in the gel layer 2, and therefore preferably, plasticizers are not added as the additives. Usually, when plasticizers are not added, the gel layer 2 may have poor mechanical properties such as elongation at break and heat resistance, but with the present invention, a gel layer 2 with excellent mechanical properties can be produced even without addition of the plasticizer. That is, the above-described gel layer 2 exhibits no bleeding of plasticizers, and has excellent mechanical properties and heat resistance.

In particular, in the above-described gel layer 2, a polyol having an average functionality of 3.0 or less (preferably, polyol having average functionality of 2.0) is used, and therefore low hardness can be exhibited, and at the same time, the aliphatic polyisocyanate having an average functionality of more than 2.0 (preferably, aliphatic polyisocyanate having an average functionality of 3.0 or more, and more preferably, isocyanurate derivative of aliphatic polyisocyanate) is used, and therefore excellent strength can be achieved. Furthermore, when pentamethylene diisocyanate is used as the aliphatic polyisocyanate in the above-described gel layer 2, compared with the case where hexamethylenediisocyanate is used, the aliphatic polyisocyanate derivative has a high isocyanate group concentration, and therefore even if the equivalent ratio (NCO/active hydrogen group) (described later) in urethane-formation reaction in the production of the gel layer 2 is at the same level, the amount of polyol to be blended per unit mass of the gel layer 2 can be increased, and as a result, texture (softness) derived from polyol can be exhibited excellently. Furthermore, pentamethylene diisocyanate and a derivative thereof are not easily crystallized compared with hexamethylenediisocyanate and a derivative thereof, and therefore excellent appearance (transparency) can be achieved.

The size of the gel layer 2 is set in accordance with the types of the mold to be used, but for example, the gel layer 2 has a thickness of, for example, 0.03 mm or more, preferably 0.05 mm or more, and for example, 500 mm or less, preferably 400 mm or less.

The above-described gel layer 2 can be applied to, for example, leather, artificial or synthetic leather, and substrates such as nonwoven fabric, felt, sheet, and film.

Meanwhile, the above-described gel layer 2 may have a relatively high surface tackiness (tack properties). Thus, to achieve improvement in handleability, the surface of the gel layer 2 is covered with a coat layer 3.

The coat layer 3 is produced by allowing at least aliphatic diisocyanate and/or alicyclic diisocyanate to react with a bifunctional active hydrogen compound. The coat layer 3 is preferably produced by allowing only the aliphatic diisocyanate and/or alicyclic diisocyanate, and a bifunctional active hydrogen compound to react, and as necessary a monofuctional active hydrogen compound (described later) is blended. Particularly preferably, the coat layer 3 is produced by allowing only the following to react: aliphatic diisocyanate and/or alicyclic diisocyanate and a bifunctional active hydrogen compound.

Examples of the aliphatic diisocyanate include the above-described aliphatic diisocyanate (bifunctional monomer).

Examples of the alicyclic diisocyanate include 1,3-cyclopentanediisocyanate, 1,3-cyclopentene diisocyanate, cyclohexanediisocyanate (1,4-cyclohexanediisocyanate, 1,3-cyclohexanediisocyanate), 3-isocyanatomethyl-3,5,5-trimethylcyclohexyl isocyanate (isophoronediisocyanate) (IPDI), methylenebis(cyclohexyl isocyanate)(4,4'-, 2,4'- or 2,2'-methylenebis(cyclohexyl isocyanate, trans,trans-isomer, trans,cis-isomer, cis,cis-isomer, or a mixture thereof)) ($H_{12}$MDI), methylcyclohexanediisocyanate (methyl-2,4-cyclohexanediisocyanate, methyl-2,6-cyclohexanediisocyanate), norbornanediisocyanate (isomers or a mixture thereof)

(NBDI), and bis(isocyanatomethyl) cyclohexane (1,3- or 1,4-bis(isocyanatomethyl) cyclohexane or a mixture thereof) (H₆XDI).

For the aliphatic diisocyanate and/or alicyclic diisocyanate, in view of improvement in the thickness of the coat layer 3, decrease in surface tackiness, and texture (touch), and furthermore, heat resistance and light resistance (weatherability), preferably, alicyclic diisocyanate is used, more preferably bis(isocyanatomethyl) cyclohexane is used, and further preferably 1,4-bis(isocyanatomethyl) cyclohexane is used.

The bifunctional active hydrogen compound is a compound having two active hydrogen groups. In the bifunctional active hydrogen compound, the active hydrogen group is defined as one active hydrogen group that releases one active hydrogen therefrom in the reaction to be described later, and examples thereof include a hydroxyl group, amino group, and mercapto group, and preferably, a hydroxyl group and amino group are used.

For the bifunctional active hydrogen compound, to be specific, diol and diamine are used.

Diol is polyol having two hydroxyl groups, and examples thereof include high-molecular weight diol and low-molecular-weight diol.

The high-molecular weight diol is bifunctional polyol having two hydroxyl groups and having a number average molecular weight of, for example, 400 or more, and generally 5000 or less, and of the above-described high-molecular weight polyols, polyols having an average functionality of two are used.

For the high-molecular weight diol, to be specific, polyetherdiol, polyesterdiol, and polycarbonatediol are used.

Examples of the polyetherdiol include polyoxyalkylenediol, polytetramethylene ether glycol, and polytrimethylene ether glycol.

For the polyoxyalkylenediol, an addition polymerization product (including random and/or block copolymer of two or more types of alkylene oxide) of alkylene oxides such as ethylene oxide and propyleneoxide produced by using the above-described dihydric alcohol as an initiator is used.

Examples of the polytetramethylene ether glycol include a ring-opening polymerization product produced by cationic polymerization of tetrahydrofuran, and noncrystalline polytetramethylene ether glycol (average functionality 2) produced by copolymerizing dihydric alcohol to be described later with polymerization unit of tetrahydrofuran.

Furthermore, plant derived polytetramethylene ether glycol produced by using tetrahydrofuran produced from a plant derived material such as furfural as a starting material can also be used.

Examples of the polytrimethylene ether glycol include polyol produced from polycondesnsation of plant derived 1,3-propanediol.

Polyesterdiol can be produced by condensation reaction of the above-described dicarboxylic acid with the above-described dihydric alcohol and transesterification of the above-described alkylester of dicarboxylic acid with the above-described dihydric alcohol. Examples of the alkylester of dibasic acid include C1 to 4 alkylester of the above-described dibasic acid.

Examples of the polycarbonatediol include a ring-opening polymerization product of ethylenecarbonate produced by using the above-described dihydric alcohol as an initiator, and noncrystalline polycarbonatepolyol produced by copolymerization of dihydric alcohols such as 1,4-butanediol, 1,5-pentanediol, 3-methyl-1,5-pentanediol, and 1,6-hexanediol with a ring-opening polymerization product.

Examples of the polycarbonatediol include plant derived polycarbonatediol, and to be specific, an alicyclic dihydroxy compound such as isosorbide derived from a plant derived material such as glucose, and polycarbonatepolyol produced by transesterification of the above-described dihydric alcohol with diphenyl carbonate.

These high-molecular weight diols may be used singly or in a combination of two or more.

For the high-molecular weight diol, preferably, polyetherdiol is used, more preferably, polytetramethylene ether glycol is used, and even more preferably, non-amorphous (crystalline) polytetramethylene ether glycol is used.

Examples of the low-molecular-weight diol include the above-described dihydric alcohols, to be specific, dihydric alcohols such as ethylene glycol, propylene glycol, 1,3-propanediol, 1,4-butyleneglycol, 1,3-butyleneglycol, 1,2-butyleneglycol, 1,5-pentanediol, 1,6-hexanediol, neopentyl glycol, 3-methyl-1,5-pentanediol, 2,2,2-trimethylpentanediol, 3,3-dimethylolheptane, alkane (C7 to 20) diol, 1,3- or 1,4-cyclohexanedimethanol and a mixture thereof, 1,3- or 1,4-cyclohexanediol and a mixture thereof, hydrogenated bisphenol A, 1,4-dihydroxy-2-butene, 2,6-dimethyl-1-octene-3,8-diol, bisphenol A, diethylene glycol, triethylene glycol, and dipropylene glycol.

These low-molecular-weight diols may be used singly or in a combination of two or more.

For the low-molecular-weight diol, preferably, a low-molecular-weight diol having 2 to 4 carbon atoms is used, more preferably 1,4-butylene glycol and ethylene glycol are used.

Diamine is polyamine having two amino groups, and examples thereof include low-molecular-weight diamine having a molecular weight of 60 or more and less than 400 such as ethylenediamine, 1,2-propylene diamine, 1,3-propylene diamine, 1,4-butylenediamine, 1,5-pentamethylenediamine, 1,6-hexamethylenediamine, 2-methyl-1,5-pentanediamine, 3-methyl-1,5-pentanediamine, triethylenediamine, m-xylylenediamine, piperazine, o-, m- and p-phenylenediamine, 1,3-diaminocyclohexane, 1,4-diaminocyclohexane, N,N-(methylene-4,1-phenylene) bis[2-(ethylamino)-urea], 1,3-bis(aminomethyl) cyclohexane, 1,4-bis(aminomethyl) cyclohexane, hydrazine, 3-aminomethyl-3,5-5-trimethylcyclohexylamine (also called: isophoronediamine), 4,4'-dicyclohexylmethanediamine, 2,5 (2,6)-bis(aminomethyl) bicyclo[2.2.1]heptane, 1,amino-3-aminomethyl-3,5,5-trimethylcyclohexane, bis-(4-aminocyclohexyl) methane, diaminocyclohexane, and 3,9-bis(3-aminopropyl)2,4,8,10-tetraoxaspiro[5,5]undecane.

Examples of diamine also include alkoxysilane-containing diamine such as N-β (aminoethyl) γ-aminopropyltrimethoxysilane and N-β (aminoethyl) γ-aminopropylmethyldimethoxysilane.

These diamines may be used singly or in a combination of two or more.

For diamine, preferably, low-molecular-weight diamine, more preferably, ethylenediamine and 1,2-propylene diamine are used.

Use of diamine as the bifunctional active hydrogen compound allows for formation of a polyurethane urea structure in the coat layer 3.

These bifunctional active hydrogen compounds may be used singly or in a combination of two or more.

For the bifunctional active hydrogen compound, preferably, high-molecular weight diol and low-molecular-weight diol and/or diamine are used in combination, and more preferably, high-molecular weight diol and low-molecular-weight diol are used in combination.

In the production of the coat layer 3, as necessary, a bifunctional active hydrogen compound and a monofuctional active hydrogen compound are used in combination.

The monofuctional active hydrogen compound is a compound having one active hydrogen group, and to be specific, for example, monol and monoamine are used.

Monol is a compound having one hydroxyl group, and examples thereof include aliphatic monols such as methanol, ethanol, propanol, isopropanol, butanol, isobutanol, s-butanol, t-butanol, pentanol, hexanol, heptanol, octanol, nonanol, decanol, laurylalcohol, myristyl alcohol (tetradecanol), pentadecanol, cetyl alcohol (hexadecanol), heptadecanol, stearyl alcohol (octadecanol), nonadecanol, other alkanol (C20 to 50), oleylalcohol, polyethylene ether monol, and polybutylene ether monol; alicyclic monol such as cyclohexanol and methylcyclohexanol; and araliphatic monol such as benzylalcohol.

Monoamine is a compound having one amino group, and examples thereof include dimethylamine, diethylamide, di-n-propylamine, diisopropylamine, di-n-butylamine, diisobutylamine, di-t-butylamine, dihexylamine, 2-ethylhexylamine, 3-methoxypropylamine, 3-ethoxypropylamine, 3-(2-ethylhexyloxypropylamine), 3-(dodecyloxy) propylamine, and morpholine.

For the monoamine, furthermore, alkoxysilane-containing monoamine such as γ-aminopropyltriethoxysilane, γ-aminopropyltrimethoxysilane, γ-aminopropylmethyldimethoxysilane, and γ-aminopropylmethyldiethoxysilane are used.

These monofunctional active hydrogen compounds may be used singly or in a combination of two or more.

When the monofunctional active hydrogen compound is used, its type and blending ratio is suitably set in accordance with the type of the bifunctional active hydrogen compound and blending ratio.

For example, when diamine is used as the bifunctional active hydrogen compound, for the monofunctional active hydrogen compound, preferably, monoamine is used, more preferably, diethylamine is used. By using diamine and monoamine in combination, application of the polyurethane resin solution to be described later can be improved.

When the monoamine is used, and for example, when diamine and monoamine are used in combination, relative to a total amount of the amino group of diamine and the amino group of monoamine, the proportion of the amino group of diamine is, for example, 80 mol % or more, preferably 85 mol % or more, more preferably 90 mol % or more, and for example, 99 mol % or less, preferably 97 mol % or less, more preferably 95 mol % or less. The proportion of the amino group of monoamine is, for example, 1 mol % or more, preferably 3 mol % or more, more preferably 5 mol % or more, for example, 20 mol % or less, preferably 15 mol % or less, more preferably 10 mol % or less.

To produce the coat layer 3, the above-described aliphatic diisocyanate and/or alicyclic diisocyanate and the above-described bifunctional active hydrogen compound are subjected to urethane-formation reaction.

In the urethane-formation reaction, known processes such as, for example, one shot process and prepolymer process are used, and preferably, prepolymer process is used.

In the prepolymer process, for example, first the above-described aliphatic diisocyanate and/or alicyclic diisocyanate and a portion of the bifunctional active hydrogen compound (preferably, high-molecular weight diol) are allowed to react to synthesize an isocyanate group-terminated prepolymer having an isocyanate group at its molecular terminal. Then, the produced isocyanate group-terminated prepolymer and the remaining portion of the bifunctional active hydrogen compound (preferably, low-molecular-weight diol) are allowed to react to cause chain extension reaction. In the prepolymer process, the remaining portion of the bifunctional active hydrogen compound is used as the chain extender.

To be more specific, to synthesize the isocyanate group-terminated prepolymer, the aliphatic diisocyanate and/or alicyclic diisocyanate and the portion of the bifunctional active hydrogen compound (preferably, high-molecular weight diol) are formulated (mixed) so that the equivalent ratio (NCO/active hydrogen group) of the isocyanate group in the aliphatic diisocyanate and/or alicyclic diisocyanate relative to the active hydrogen group (preferably, hydroxyl group) in the portion of the bifunctional active hydrogen compound (preferably, high-molecular weight diol) is more than 1.0, for example, 1.1 to 20, preferably 1.3 to 10, more preferably 1.3 to 6, and are allowed to react in a reaction vessel at, for example, room temperature to 150° C., preferably 50 to 120° C., for, for example, 0.5 to 18 hours, preferably 2 to 10 hours. In this reaction, as necessary, the above-described urethane-formation catalyst can be added at a suitable ratio, and a solvent to be described later can be blended at a suitable ratio. Preferably, the reaction is performed in the absence of solvent without blending the solvent.

When the above-described component is allowed to react in the absence of solvent, preferably, a solvent is added after the completion of reaction, and the isocyanate group-terminated prepolymer is dissolved in the solvent.

Examples of the solvent include ketones such as acetone, methyl ethyl ketone, methylisobutylketone, and cyclohexanone; nitriles such as acetonitrile; alkylesters such as methyl acetate, ethyl acetate, butyl acetate, and isobutyl acetate; aliphatic hydrocarbons such as n-hexane, n-heptane, and octane; alicyclic hydrocarbons such as cyclohexane and methylcyclohexane; aromatic hydrocarbons such as toluene, xylene, and ethylbenzene; glycolether esters such as methylcellososolveacetate, ethylcellosolveacetate, methylcarbitolacetate, ethylcarbitolacetate, ethylene glycol ethylether acetate, propylene glycol methylether acetate, 3-methyl-3-methoxybutylacetate, and ethyl-3-ethoxypropionate; ethers such as diethylether, tetrahydrofuran, and dioxane; halogenated aliphatic hydrocarbons such as methyl chloride, methylene chloride, chloroform, carbon tetrachloride, methyl bromide, methylene iodide, and dichloroethane; and aprotic solvents such as N-methylpyrrolidone, N,N'-dimethylformamide, N,N'-dimethylacetamide, dimethyl sulfoxide, and hexamethylphosphonylamide.

These solvents may be used singly or in a combination of two or more.

For the solvent, preferably, aprotic solvents are used, more preferably, N,N'-dimethylformamide and N,N'-dimethylacetamide are used. The blending ratio of the solvent is not particularly limited, and is set suitably in accordance with the purpose and application. In this method, as necessary, unreacted aliphatic diisocyanate and/or alicyclic diisocyanate can also be removed by known removal methods such as, for example, distillation and extraction.

Next in this method, the produced isocyanate group-terminated prepolymer and the remaining portion of the bifunctional active hydrogen compound (preferably, low-molecular-weight diol) are allowed to react, preferably in the presence of the above-described solvent (solution polymerization).

For example, when the low-molecular-weight diol is used as the remaining portion of the bifunctional active hydrogen compound, to allow the isocyanate group-terminated prepolymer and the remaining portion of the bifunctional active hydrogen compound (low-molecular-weight diol) to react, the isocyanate group-terminated prepolymer and the remaining portion of the bifunctional active hydrogen compound (low-molecular-weight diol) are formulated (mixed) so that the equivalent ratio (NCO/active hydrogen group) of the isocyanate group in the isocyanate group-terminated prepolymer relative to the active hydrogen group (hydroxyl group) of the remaining portion of the bifunctional active hydrogen compound (low-molecular-weight diol) is, for example, 0.75 to 1.3, preferably 0.9 to 1.1, and subjected to curing reaction at, for example, room temperature to 250° C., preferably room temperature to 200° C., for, for example, 5 minutes to 72 hours, preferably 1 to 24 hours. In this reaction, as necessary, the above-described urethane-formation catalyst can be added at a suitable ratio.

A solution of polyurethane resin is produced in this manner.

When diamine (and monoamine blended as necessary) is used as the remaining portion of the bifunctional active hydrogen compound, to allow the isocyanate group-terminated prepolymer and the remaining portion of the bifunctional active hydrogen compound (diamine (and monoamine)) to react, the isocyanate group-terminated prepolymer and the remaining portion of the bifunctional active hydrogen compound (diamine (and monoamine)) are formulated (mixed) so that the equivalent ratio (NCO/active hydrogen group) of the isocyanate group in the isocyanate group-terminated prepolymer relative to the active hydrogen group (amino group) of the remaining portion of the bifunctional active hydrogen compound (diamine (and monoamine)) is, for example, 0.75 to 1.3, preferably 0.9 to 1.1, and subjected to curing reaction at, for example, room temperature to 80° C., preferably, room temperature to 40° C., for, for example, 5 minutes to 8 hours, preferably 10 minutes to 2 hours.

A solution of polyurethane resin having a urea bond is produced in this manner.

The above-described additives can be added to the polyurethane resin solution in accordance with purpose and use. The ratio of the additives added is not particularly limited, and is set suitably.

The thus produced polyurethane resin solution has a polyurethane resin solid content concentration of, for example, 10 mass % or more, preferably 15 mass % or more, and for example, 40 mass % or less, preferably 30 mass % or less.

The polyurethane resin solution has a viscosity at 25° C. (20 mass %) of, for example, 10000 mPa·s or more, preferably 15000 mPa·s or more, more preferably 23000 mPa·s or more, and for example, 100000 mPa·s or less, preferably 50000 mPa·s or less, more preferably 35000 mPa·s or less.

To form the coat layer 3, the polyurethane resin solution produced as described above is applied, for example, to a desired portion (surface of the gel layer 2, and inner surface of the mold to be described later, etc.), and dried.

The drying conditions are as follows: under inactive gas atmosphere, drying temperature of, for example, 20° C. or more, preferably 40° C. or more, more preferably 60° C. or more, for example, 100° C. or less, preferably 90° C. or less. The drying time is, for example, 10 minutes or more, preferably 30 minutes or more, and for example, 24 hours or less, preferably 8 hours or less, more preferably 2 hours or less.

A coat layer 3 (polyurethane film) made of polyurethane resin is formed in this manner, and a polyurethane gel 1 is produced by covering the gel layer 2 with such a coat layer 3.

The coat layer 3 has a thickness of, for example, 1000 µm or less, preferably 500 µm or less, more preferably 400 µm or less, more preferably 300 µm or less, more preferably 200 µm or less, more preferably 150 µm or less, particularly preferably 100 µm or less, and for example, 1 µm or more, preferably 2 µm or more, more preferably 5 µm or more, more preferably 10 µm or more, more preferably 15 µm or more.

When the coat layer 3 has a thickness in the above-described range, tackiness (tack properties) of the surface of the gel layer 2 can be excellently reduced, and excellent texture (touch) can be obtained.

That is, although generally excellent texture (touch) can be obtained when the coat layer 3 has a relatively small thickness, tackiness (tack properties) on the surface of the gel layer 2 may be poorly reduced. Furthermore, when the coat layer 3 is made relatively thick in order to reduce tackiness (tack properties) of the surface of the gel layer 2, texture (touch) may be poor.

In contrast, with the above-described coat layer 3, in particular, when the above-described alicyclic diisocyanate (preferably, bis(isocyanatomethyl) cyclohexane) is used in the coat layer 3, tackiness (tack properties) on the surface of the gel layer 2 can be excellently reduced, and excellent texture (touch) can be produced even if the coat layer 3 has a relatively small thickness as described above.

The coat layer 3 can be formed, for example, directly on the surface of the gel layer 2, or can be formed in a mold for molding the gel layer 2, or both.

When the coat layer 3 is formed directly on the surface of the gel layer 2, for example, the above-described polyurethane resin solution is applied on the surface of the gel layer 2 molded in advance, and dried. The polyurethane gel 1 is produced in this manner.

When the coat layer 3 is formed in the mold in advance, for example, before molding the gel layer 2, the above-described polyurethane resin solution is applied inside the mold, and dried, therein forming the coat layer 3. Then, in the mold in which the coat layer 3 is formed, the gel layer 2 is molded. The polyurethane gel 1 is produced in this manner.

For the method for producing the polyurethane gel 1, preferably, the above-described method is used in a combined manner.

Figure 2A:
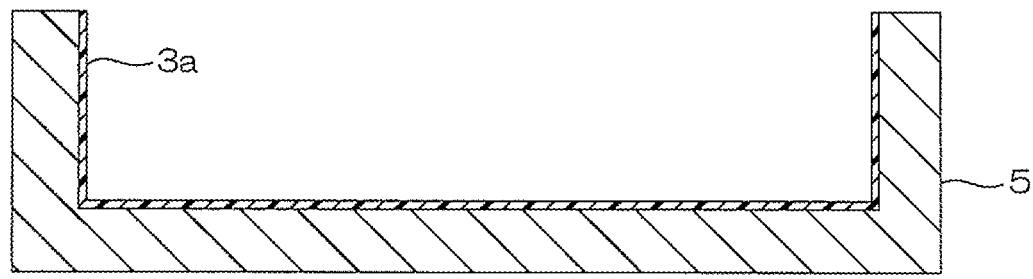
FIG. 2 shows a schematic diagram illustrating an embodiment of the method for producing a polyurethane gel shown in FIG. 1, FIG. 2A showing a step of forming a coat layer on the surface of a mold, FIG. 2B showing a step of molding a gel layer in the mold in which the coat layer is formed, FIG. 2C showing a step of releasing the coat layer and the gel layer, and FIG. 2D showing a step of forming a coat layer on the exposed surface of the gel layer.

To be specific, first, as shown in FIG. 2A, the polyurethane resin solution produced as described above is poured into the surface of the mold 5, and dried, thereby forming a coat layer 3a along the inner shape of the mold 5.

Figure 2B:
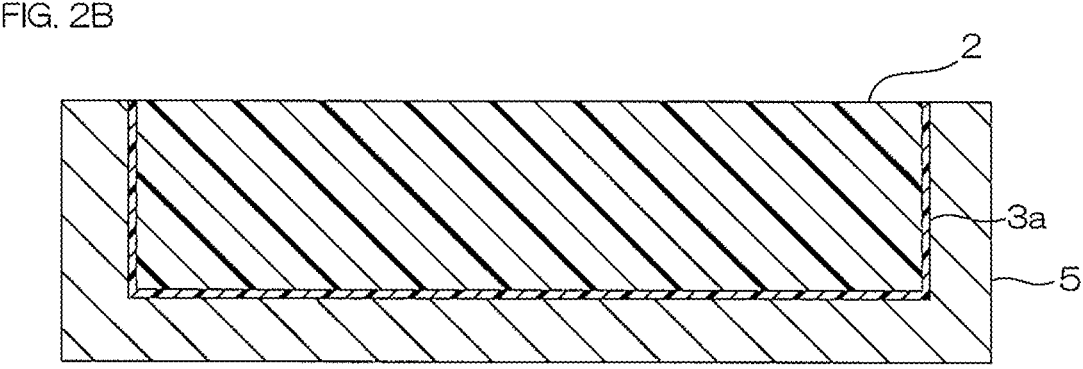

Then, as shown in FIG. 2B, material of the gel layer 2 (aliphatic polyisocyanate and polyol) are pooled into the mold 5 in which the coat layer 3a is formed, and reaction is caused on the surface of the coat layer 3a in the mold 5, thereby forming the gel layer 2.

Figure 2C:
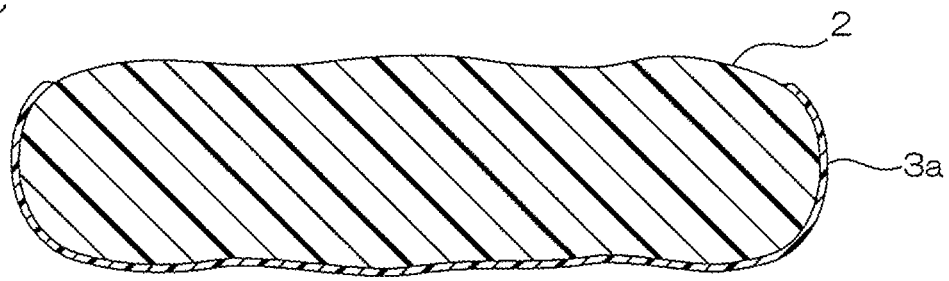
Figure 2D:
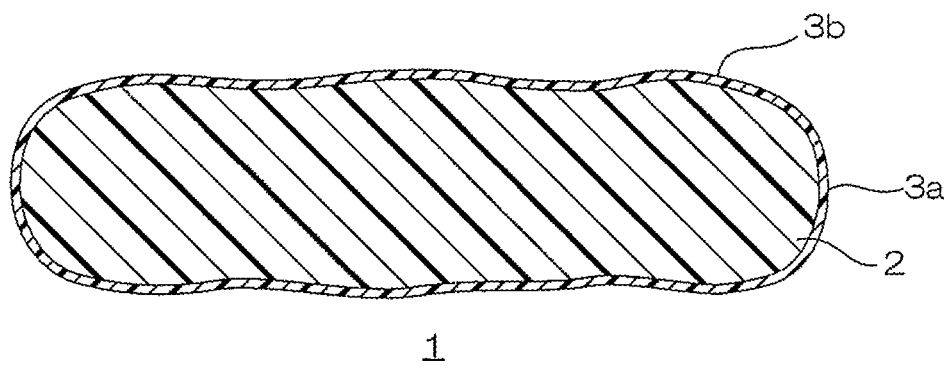

Thereafter, as shown in FIG. 2C, the gel layer 2 and the coat layer 3a are removed from the mold, and thereafter, the above-described polyurethane resin solution is applied on the surface of the exposed surface of the gel layer 2 where the coat layer 3a is not formed, thereby forming the coat layer 3b.

The polyurethane gel 1 with the entire surface of the gel layer 2 covered with the coat layer 3 is produced is this manner.

Such a polyurethane gel 1 includes the gel layer 2 and the coat layer 3 covering the gel layer 2. The gel layer 2 is produced by allowing at least aliphatic polyisocyanate having an average functionality of 3.0 or more and polyol having an average functionality of 3.0 or less to react, and the coat layer 3 is produced by allowing at least aliphatic diisocyanate and/or alicyclic diisocyanate and polyol to react.

Therefore, with such a polyurethane gel 1, improvement in handleability, mechanical properties and heat resistance, and furthermore, light resistance (weatherability) can be all achieved.

To be specific, the polyurethane gel 1 is a super-low hardness polyurethane elastomer, and its Shore C hardness (JIS K 7312 (1996) is, for example, 0 or more, for example, 15 or less, preferably 13 or less, more preferably 10 or less, further preferably 7 or less, more preferably 5 or less, particularly preferably 2 or less.

When the Shore C hardness is in the above-described range, in particular, 10 or less, it can be suitably used as a gel having texture, elasticity, and softness similar to human skin (hereinafter referred to as human skin gel). Furthermore, in the polyurethane gel of the present invention, aliphatic isocyanate having a particular functionality and polyol having a particular functionality are used, and therefore compared with conventional polyurethane gel, balance in physical properties such as mechanical properties (elongation at break, etc.) and heat resistance is excellent. Although factors for exhibiting such physical property balance are not certain, one of the factors can be the isocyanate component used in the present invention, which allows for formation of a relatively homogeneous network structure.

The above-described polyurethane gel 1 has excellent heat resistance. To be specific, for example, when the polyurethane gel 1 has a 2 mm gel layer 2 and a 20 μm coat layer 3 laminated thereon, the polyurethane gel 1 has a softening temperature (measurement method: dynamic viscoelasticity (shear mode, temperature increase speed: 3° C./min, measurement frequency: 10 Hz) tangent method) of, for example, 150° C. or more, preferably 180° C. or more, more preferably 200° C. or more.

When the softening temperature is in the above-described range, changes in texture in the environment (heat environment) where use of the polyurethane gel 1 is assumed can be suppressed.

The polyurethane gel 1 has excellent light resistance (weatherability). To be specific, for example, when the polyurethane gel 1 has a 2 mm gel layer 2 and a 20 μm coat layer 3 laminated thereon, the polyurethane gel 1 has a color change (ΔE) of, before and after 10 days xenon application test (application intensity: 100 W/m$^2$, black panel temperature: 89° C., relative humidity: 50%), for example, 5 or less, preferably 3 or less, more preferably 2 or less, even more preferably 1 or less.

When the color change is in the above-described range, changes in appearance can be suppressed in the environment (light environment) where use of the polyurethane gel 1 is assumed.

The polyurethane gel 1 can be suitably used as a vibration isolation-seismic isolation members, shock absorbing members, cushion members, surface protection members, cushioning materials, elbow pads, arm pads, switches, robot members, robot skin, mannequins, mobility members, pads, apparel members, aircrafts members, cosmetics products, medical appliances, caregiving-apparel products such as diapers and bedsore prevention materials, wearable materials, eyewear such as frames, ear and nose pads for eyewear, earphone, headphone, sport members such as grips, toys, playground equipment, protectors such as helmets, furniture, soft sensors, sheets, soft rods, nonwoven fabric, composite material with felt, shoe sole, shoe sore prevention, actuator, human skin gel, and in particular, can be used suitably as a human skin gel.

Such a polyurethane gel 1 can also be used by being encapsulated in, for example, fabric such as cotton, silk, synthetic fiber, natural and artificial leather, paper, nonwoven fabric, resin film, and soft foam.

In particular, when aliphatic diisocyanate derivative (preferably, pentamethylene diisocyanate derivative) is used as the material component of the gel layer 2 and alicyclic diisocyanate (preferably, bis(isocyanatomethyl) cyclohexane) is used as the material component of the coat layer 3, the polyurethane gel 1 can achieve both of texture (softness) of the gel layer 2 and the texture (touch) of the coat layer 3, and furthermore, the polyurethane gel 1 has excellent heat resistance and light resistance (weatherability). Therefore, the polyurethane gel 1 is suitably used as human skin gel.

Furthermore, with the above-described method for producing polyurethane gel, the polyurethane gel 1 having both improved handleability and improved mechanical properties and heat resistance, and in addition, excellent light resistance (weatherability) can be produced.

EXAMPLES

While in the following, the present invention is described with reference to Production Examples, Examples, and Comparative Examples, the present invention is not limited to any of them by no means. The "parts" and "%" based on mass unless otherwise specified. The specific numerical values in blending ratio (content ratio), property value, and parameter used in the following description can be replaced with upper limit values (numerical values defined as "or less" or "below") or lower limit values (numerical values defined as "or more" or "above") of corresponding numerical values in blending ratio (content ratio), property value, and parameter described in the above-described "DESCRIPTION OF EMBODIMENTS".

The measurement methods used in Production Examples, Examples, and Comparative Examples are described below.

1. Measurement Method

<Isocyanate Group Concentration (Unit: Mass %), Isocyanate Group Conversion Rate (Unit: Mass %)>

The isocyanate group concentration (isocyanate group content) was measured in conformity with toluene/dibutylamine-hydrochloric acid method in JIS K-1603-1 (2007) using a potential difference titrator (manufactured by Kyoto Electronics Manufacturing Co., Ltd., model number: AT-510), and the conversion rate of the isocyanate group in the measurement sample was calculated based on the formula below.

Isocyanate group conversion rate=[(isocyanate group concentration of reaction solution before reaction−isocyanate group concentration of reaction solution after reaction)/isocyanate group concentration of reaction solution before reaction]×100

<Isocyanate Monomer Concentration (Unit: Mass %)>

Pentamethylene diisocyanate produced in the same manner as in Example 1 of DESCRIPTION of WO 2012/121291 or commercially available hexamethylenediisocyanate was used as a standard sample, and labeled with dibenzylamine. The unreacted isocyanate monomer (pentamethylene diisocyanate monomer or hexamethylenediisocyanate monomer) concentration was calculated based on the calibration curve made from the area value of a chromatogram obtained under HPLC analysis conditions below.

Device; Prominence (manufactured by Shimadzu Corporation)
Pump LC-20AT
Degasser DGU-20A3
Autosampler SIL-20A
Column thermostatic chamber COT-20A
Detector SPD-20A
Column; SHISEIDO SILICA SG-120
Column temperature; 40° C.
Eluent; n-hexane/methanol/1,2-dichloroethane=90/5/5 (volume ratio)
Flow rate; 0.2 mL/min
Detection method; UV 225 nm
<Viscosity (Unit: mPa·s)>

The viscosity (unit: Pa·s) of the polyurethane resin solution was measured using type E viscometer (manufactured by TOKI Sangyo Co., Ltd., trade name: TOKIMEC TV-30 VISCOMETER) with a rotor having a size of 1°34'×R24 under condition of a temperature of 25° C. The amount of the sample at that time was about 1 to 1.2 mL.

<Mole Ratio of Allophanate Group to Isocyanurate Group with $^1$H-NMR>

$^1$H-NMR measurement was conducted with the following devices and conditions, and the allophanate group content (allophanate group/isocyanurate group mole ratio) relative to 1 mol of the isocyanurate group in aliphatic polyisocyanate was calculated based on the following formula. Tetramethylsilane (0 ppm) in $D^6$-DMSO solvent was used as the base of chemical shift ppm.

Device; JNM-AL400 manufactured by JEOL)
Conditions; measurement frequency: 400 MHz, solvent: $D^6$-DMSO, solute concentration: 5 mass %
Peak assigned to protons of isocyanurate group (methylene group ($CH_2$ group) directly bonded to isocyanurate group) (6H): 3.8 ppm
Peak assigned to protons of allophanate group (NH group in allophanate group) (1H): 8.3 to 8.7 ppm Allophanate group/isocyanurate group (mole ratio)
= integrated value of peak assigned to protons of allophanate group/(integrated value of peak assigned to protons of isocyanurate group/6)

<Calculation of Mole Ratio of Uretdione Group to Isocyanurate Group with $^{13}$C-NMR>

$^{13}$C-NMR measurement was conducted with the following devices and conditions, and the uretdione group content (uretdione group/isocyanurate group mole ratio) relative to 1 mol of isocyanurate group in the polyisocyanate derivative or polyisocyanate composition was calculated based on the following formula. Tetramethylsilane (0 ppm) in $CDCL_3$ solvent was used as the base of chemical shift ppm.

Device; JNM-Al400 (manufactured by JEOL)
Conditions; measurement frequency: 100 MHz, solvent $CDCL_3$, solute concentration: 50 mass %
Peak assigned to carbon in uretdione group (CO group in uretdione group) (2H): 157.8 ppm
Peak assigned to carbon in isocyanurate group (CO group in isocyanurate group) (3H): 149.1 ppm Uretdione group/isocyanurate group (mole ratio)=
(integrated value of peak assigned to carbon in uretdione group/2)/(integrated value of peak assigned to carbon in isocyanurate group/3)

<Average Isocyanate Group Number (Average Functionality)>

The average isocyanate group number of polyisocyanate was calculated based on the following formula from the isocyanate group concentration, the solid content concentration (NV), and the number average molecular weight in gel permeation chromatography conducted based on the devices and conditions below.

Average isocyanate group number=$A/B \times C/42.02$ (where A represents isocyanate group concentration, B represents solid content concentration, and C represents number average molecular weight)

Device: HLC-8220GPC (manufactured by Tosoh Corporation)
Column: TSKgelG 1000HXL, TSKgelG 2000HXL, and TSKgelG 3000HXL (manufactured by Tosoh Corporation) connected in series
Detector: refractive index detector
Measurement conditions
Amount injected: 100 μL
Eluent: tetrahydrofuran
Flow rate: 0.8 mL/min
Temperature: 40° C.
Calibration curve: standard polyethyleneoxide (manufactured by Tosoh Corporation, trade name: TSK standard polyethyleneoxide) in the range of 106 to 22450

<Average Hydroxyl Group Number (Average Functionality)>

The average functionality of polyol was calculated based on the hydroxyl number and the number average molecular weight with the following formula.

Average hydroxyl group number=hydroxyl number×
number average molecular weight/56100

The hydroxyl number was measured in conformity with method A (acetylation method) of JIS K1557-1 (2007).

Production Example 1 (Production of Pentamethylene Diisocyanate (a))

99.9 mass % of pentamethylene diisocyanate (a) (hereinafter may be referred to as PDI (a)) was produced in the same manner as in Example 1 of DESCRIPTION of WO 2012/121291.

To be more specific, a pressurized reactor with jacket equipped with an electromagnetic induction stirrer, an automatic pressure regulating valve, a thermometer, a nitrogen inlet line, a phosgene inlet line, a condenser, and a material feed pump was charged with 2000 parts by mass of o-dichlorobenzene. Then, 2300 parts by mass of phosgene was added from the phosgene inlet line, and stirring was started. Cold water was allowed to go through the reactor jacket so that the internal temperature was kept to about 10° C. Then, a solution of 400 parts by mass of pentamethylenediamine (a) dissolved in 2600 parts by mass of o-dichlorobenzene was fed through the feed pump taking 60 minutes, and cold phosgenation was started at 30° C. or less under normal pressure. After the completion of the feed, a light-brown white slurry was formed in the pressurized reactor.

Then, while the temperature of the internal liquid of the reactor was gradually increased to 160° C., the pressure was increased to 0.25 MPa, and further hot phosgenation was performed under a pressure of 0.25 MPa, and at a reaction temperature of 160° C. for 90 minutes. During the hot phosgenation, 1100 parts by mass of phosgene was further added. In the process of the hot phosgenation, the internal liquid of the pressurized reactor became light-brown clear solution. After completion of hot phosgenation, at 100 to 140° C., nitrogen gas was allowed to pass through at 100 L/hour, and degassing was performed.

Thereafter, o-dichlorobenzene was distilled off under reduced pressure, and then pentamethylene diisocyanate was distilled off also under reduced pressure, thereby producing 558 parts by mass of pentamethylene diisocyanate ($a_0$) with purity of 98.7%.

Then, a four-neck flask equipped with a stirrer, a thermometer, a reflux pipe, and a nitrogen inlet tube was charged with 558 parts by mass of pentamethylene diisocyanate ($a_0$), and 0.02 parts by mass of tris(tridecyl) phosphite (manufactured by Johoku Chemical Co., Ltd, trade name: JP-333E) relative to 100 parts by mass of pentamethylene diisocyanate, and while introducing nitrogen, heat treatment was performed under normal pressure, at 210° C., for 2 hours, thereby producing 553 parts by mass of pentamethylene diisocyanate ($a_1$) having a purity of 98.3%. The yield of pentamethylene diisocyanate in heat treatment was 99.6%.

Then, pentamethylene diisocyanate ($a_1$) after heat treatment was introduced to a glass-made flask, and using a distillation apparatus equipped with a distillation pipe charged with four elements of packing materials (manufactured by Sumitomo Heavy Industries, Ltd., trade name: Sumitomo/Sulzer Laboratory packing EX type), a distillation column (manufactured by SIBATA SCIENTIFIC TECHNOLOGY LTD., trade name: distillation column K type) having a reflux ratio adjusting timer, and a condenser, the pentamethylene diisocyanate (a) was rectified while further being refluxed under the conditions of 127 to 132° C. and 2.7 KPa, taking a fraction with a distillation rate of 20 to 80%, thereby producing pentamethylene diisocyanate (a). The purity of PDI (a) was measured using a potential difference titrator, in conformity with toluene/dibutylamine-hydrochloric acid method of JIS K-1603-1 (2007), and it was found that the purity was 99.9 mass %.

Production Example 2 (Aliphatic Polyisocyanate (A): Isocyanurate Derivative of PDI)

A four-neck flask equipped with a stirrer, thermometer, reflux pipe, and nitrogen inlet tube was charged with 500 parts by mass of pentamethylene diisocyanate (a), 0.25 parts by mass of 2,6-di(tert-butyl)-4-methylphenol, and 0.25 parts by mass of tris(tridecyl) phosphite, and the temperature was increased to 60° C.

Then, 0.1 parts by mass of N-(2-hydroxypropyl)-N,N,N-trimethylammonium-2-ethylhexanoate was added as the isocyanurate-formation catalyst. After allowing the mixture to react for 1 hour, 0.12 parts by mass of o-toluenesulfonamide was added (isocyanate group conversion rate: 10 mass %).

Thereafter, the produced reaction solution was allowed to pass through a thin-film distillation device (degree of vacuum 0.093 KPa, temperature 150° C.) to remove unreacted pentamethylene diisocyanate, and furthermore, 0.02 parts by mass of o-toluenesulfonamide was added relative to 100 parts by mass of the produced composition, thereby producing aliphatic polyisocyanate (A).

The aliphatic polyisocyanate (A) had an isocyanate monomer concentration of 0.5 mass %, the isocyanate group concentration of 25.8 mass %, and a viscosity at 25° C. of 1500 mPa·s.

Production Example 3 (Aliphatic Polyisocyanate (B): Alcohol-Modified Isocyanurate Derivative of PDI)

A four-neck flask equipped with a thermometer, stirrer, reflux pipe, and nitrogen inlet tube was charged with 500 parts by mass of pentamethylene diisocyanate (a) produced in Production Example 1, 0.5 parts by mass of isobutylalcohol, 0.3 parts by mass of 2,6-di(tert-butyl)-4-methylphenol, and 0.3 parts by mass of tris(tridecyl) phosphite, and the mixture was allowed to react at 80° C. for 2 hours.

Then, 0.05 parts by mass of N-(2-hydroxypropyl)-N,N,N-trimethylammonium-2-ethylhexanoate was blended as the isocyanurate-formation catalyst. The isocyanate group concentration was measured, and the reaction was continued until the concentration reached 48.9 mass % (that is, conversion rate 10 mass %). 0.12 parts by mass of o-toluenesulfonamide was added when a predetermined conversion rate (conversion rate 10 mass %) was reached after 50 minutes.

Thereafter, the produced reaction mixture was allowed to pass through a thin-film distillation device (temperature: 150° C., degree of vacuum: 0.093 kPa) to remove unreacted pentamethylene diisocyanate, and furthermore, 0.02 parts by mass of o-toluenesulfonamide and 0.003 parts by mass of benzoyl chloride were added relative to 100 parts by mass of the produced residue, thereby producing aliphatic polyisocyanate (B).

The aliphatic polyisocyanate (B) had an isocyanate monomer concentration of 0.5 mass %, an isocyanate group concentration of 24.6 mass %, and a viscosity at 25° C. of 2000 mPa·s.

The aliphatic polyisocyanate (B) had a mole ratio of allophanate group to isocyanurate group with $^1$H-NMR measurement of allophanate group/isocyanurate group=7.4/100 (that is, allophanate group content relative to 1 mol of isocyanurate group was 0.074 mol).

Production Example 4 (Aliphatic Polyisocyanate (C): Alcohol-Modified Isocyanurate Derivative of PDI)

A four-neck flask equipped with a thermometer, stirrer, reflux pipe, and nitrogen inlet tube was charged with 500 parts by mass of pentamethylene diisocyanate (a) produced in Production Example 1, 9.6 parts by mass of isobutylalcohol, 0.3 parts by mass of 2,6-di(tert-butyl)-4-methylphenol, and 0.3 parts by mass of tris(tridecyl) phosphite, and the mixture was allowed to react at 80° C. for 2 hours.

Then, 0.05 parts by mass of N-(2-hydroxypropyl)-N,N,N-trimethylammonium-2-ethylhexanoate was blended as the isocyanurate-formation catalyst. The isocyanate group concentration was measured, and the reaction was continued until the concentration reached 47.1 mass % (that is, conversion rate 10 mass %). 0.12 parts by mass of o-toluenesulfonamide was added when a predetermined conversion rate (conversion rate 10 mass %) was reached after 20 minutes.

Thereafter, the produced reaction mixture was allowed to pass through a thin-film distillation device (temperature: 150° C., degree of vacuum: 0.093 kPa) to remove unreacted pentamethylene diisocyanate monomer, and furthermore, 0.02 parts by mass of o-toluenesulfonamide and 0.003 parts by mass of benzoyl chloride were added relative to 100 parts by mass of the produced residue, thereby producing aliphatic polyisocyanate (C).

The aliphatic polyisocyanate (C) had an isocyanate monomer concentration of 0.6 mass %, isocyanate group concentration of 23.5 mass %, and viscosity at 25° C. of 900 mPa·s.

The isocyanate composition (C) had a mole ratio of allophanate group to isocyanurate group with $^1$H-NMR measurement of allophanate group/isocyanurate group=54.7/100 (that is, allophanate group content relative to 1 mol of isocyanurate group was 0.547 mol).

Production Example 5 (Aliphatic Polyisocyanate (D): Uretdione Derivative of PDI)

A reactor equipped with a thermometer, stirrer, nitrogen inlet tube, and condenser tube was charged with 500 parts by mass of pentamethylene diisocyanate (a) produced in Production Example 1, and nitrogen was introduced to the liquid phase (reaction solution) of pentamethylene diisocyanate for 1 hour. Thereafter, the temperature of the reaction solution was increased to 150° C.

Then, the reaction was continued at the same temperature for 10 hours, and then the reaction was terminated. The produced reaction mixture was allowed to pass through the thin-film distillation device (temperature: 120° C., degree of vacuum: 93.3 Pa) to remove unreacted pentamethylene diisocyanate monomer, thereby producing aliphatic polyisocyanate (D).

The produced aliphatic polyisocyanate (D) had an isocyanate monomer concentration of 0.5 mass %, isocyanate group concentration of 26.5 mass %, and viscosity at 25° C. of 24 mPa·s.

The aliphatic polyisocyanate (D) was subjected to $^1$H-NMR measurement, and the isocyanurate group and allophanate group were not found. The result of $^{13}$C-NMR analysis revealed that the uretdione group accounted for 100%.

Production Example 6 (Aliphatic Polyisocyanate (E1)

Aliphatic polyisocyanate (E1) was produced by blending 80 parts by mass of aliphatic polyisocyanate (B) obtained in Production Example 3 and 20 parts by mass of aliphatic polyisocyanate (D) produced in Production Example 5.

The aliphatic polyisocyanate (E1) had an isocyanate monomer concentration of 0.5 mass %, isocyanate group concentration of 25.0 mass %, and viscosity at 25° C. of 560 mPa·s.

The aliphatic polyisocyanate (E1) had a mole ratio of allophanate group to isocyanurate group with $^1$H-NMR measurement of allophanate group/isocyanurate group=5.9/100 (that is, allophanate group content relative to 1 mol of isocyanurate group was 0.059 mol). The mole ratio of uretdione group to isocyanurate group by $^1$H-NMR analysis was uretdione group/isocyanurate group=34/100 (that is, uretdione group content relative to 1 mol of isocyanurate group was 0.34 mol).

Production Example 7 (Aliphatic Polyisocyanate (E2))

Aliphatic polyisocyanate (E2) was produced by blending 60 parts by mass of the aliphatic polyisocyanate (B) produced in Production Example 3 and 40 parts by mass of aliphatic polyisocyanate (D) produced in Production Example 5.

The aliphatic polyisocyanate (E2) had an isocyanate monomer concentration of 0.5 mass %, isocyanate group concentration of 25.0 mass %, and viscosity at 25° C. of 150 mPa·s.

The aliphatic polyisocyanate (E2) had a mole ratio of allophanate group to isocyanurate group with $^1$H-NMR measurement of allophanate group/isocyanurate group=3.0/100 (that is, allophanate group content relative to 1 mol of isocyanurate group was 0.03 mol). The mole ratio of uretdione group to isocyanurate group with $^1$H-NMR analysis was uretdione group/isocyanurate group=60/100 (that is, uretdione group content relative to 1 mol of isocyanurate group was 0.60 mol).

Production Example 8 (Polyurethane Resin Solution (F): HDI-Based PU Solution)

In a nitrogen atmosphere, a reactor equipped with an anchor blade, thermometer, and water-cooling condenser, and capable of continuously measuring mixing torque was charged with 155.9 parts by mass of PTG-2000SN (polytetramethylene ether glycol with number average molecular weight 2000, manufactured by Hodogaya Chemical Co., LTD.) that was subjected to dehydration treatment under reduced pressure in advance and 39.3 parts by mass of hexamethylenediisocyanate (TAKENATE 700 manufactured by Mitsui Chemicals, Inc.), and the temperature of the mixture was increased to 80° C. with a mixing speed of 200 rpm.

Then, after reaction is caused at 80° C. for 1 hour, 0.004 parts by mass of stannous octoate (Stanoct) was added as a catalyst. After reaction was caused at the same temperature for further 2 hours, reaction was continued until the isocyanate group concentration was 6.7 mass %, thereby producing an isocyanate group-terminated methane prepolymer (f).

Then, the isocyanate group-terminated urethane prepolymer (f) was cooled to 50° C., and thereafter, 781 parts by mass of dimethylformamide (hereinafter referred to as DMF), which was dehydrated in advance by immersion of molecular sieves 4A, was gradually added with a stirring speed of 300 rpm so that the isocyanate group-terminated urethane prepolymer (f) concentration was 20 mass %, thereby dissolving the isocyanate group-terminated urethane prepolymer (f).

Thereafter, the DMF solution of isocyanate group-terminated urethane prepolymer (f) was heated again to 80° C. or less. 22.8 parts by mass of ethylene glycol (hereinafter referred to as EG) (manufactured by Wako Pure Chemical Industries, Ltd., special grade) diluted with DMF to 40 mass % and 0.15 parts by mass of stannous octoate were added.

Then, after causing reaction at 80° C. for 6 hours, 2.3 parts by mass of EG diluted to 40 mass % with DMF was added. Reaction was further caused at 80° C. for 1 hour.

Furthermore, 6.1 parts by mass (solid content 0.61 parts by mass) of IRGANOX 245 (manufactured by BASF, heat-resistant stabilizer), 5.1 parts by mass (solid content 0.51 parts by mass) of TINUVIN 234 (manufactured by BASF HALS), and 3.0 parts by mass (solid content 0.30 parts by mass) of ADK STAB LA-72 (manufactured by ADEKA ultraviolet ray absorber), all of which dissolved in DMF to 10 mass %, were added, thereby producing polyurethane resin solution (F). The polyurethane resin had a solid content concentration of 20 mass %, and a viscosity measured at 25° C. of 32,000 mPa·s.

Production Example 9 (1,4-bis(isocyanatomethyl) cyclohexane)

Using 1,4-bis(aminomethyl) cyclohexane (manufactured by MITSUBISHI GAS CHEMICAL COMPANY, INC.) (hereinafter referred to as 1,4-BIC) having a trans/cis ratio of 86/14 by $^{13}$C-NMR analysis as a material, cold/hot 2-stage phosgenation method was performed under pressure.

A pressurized reactor with jacket equipped with an electromagnetic induction stirrer, an automatic pressure regulating valve, a thermometer, a nitrogen inlet line, a phosgene inlet line, a condenser, and a material feed pump was charged with 2500 parts by mass of orthodichlorobenzene. Then, 1425 parts by mass of phosgene was added through the phosgene inlet line and stirring was started. Cold water was allowed to go through the reactor jacket so that the internal temperature was kept to about 10° C. Then, a solution of 400 parts by mass of 1,4-bis(aminomethyl) cyclohexane dissolved in 2500 parts by mass of orthodichlorobenzene was fed through the feed pump taking 60 minutes, and cold phosgenation was performed at 30° C. or less under normal pressure. After the completion of the feed, a light-brown white slurry was formed in the flask.

Then, while the temperature of the internal liquid of the reactor was gradually increased to 140° C. taking 60 minutes, the pressure was increased to 0.25 MPa, and further hot phosgenation was performed under a pressure of 0.25 MPa, and at a reaction temperature of 140° C. for 2 hours. During the hot phosgenation, 480 parts by mass of phosgene was further added. In the process of the hot phosgenation, the internal liquid of the flask became light-brown clear solution. After completion of hot phosgenation, at 100 to 140° C., nitrogen gas was allowed to pass through at 100 L/hour, and degassing was performed.

Then, after distilling off the solvent orthodichlorobenzene under reduced pressure, in the glass-made flask, distillation was performed with further refluxing under conditions of 138 to 143° C. and 0.7 to 1 KPa using a distillation apparatus equipped with a distillation column (manufactured by SIBATA SCIENTIFIC TECHNOLOGY LTD., trade name: distillation column K type) having a distillation pipe charged with four elements of packing materials (manufactured by Sumitomo Heavy Industries, Ltd., trade name: Sumitomo/Sulzer Laboratory packing EX type) and a reflux ratio adjusting timer, and a condenser, thereby producing 382 parts by mass of 1,4-BIC.

The produced 1,4-BIC had a purity with gas chromatography analysis of 99.9%, color with APHA analysis of 5, and trans/cis ration with $^{13}$C-NMR analysis of 86/14.

Production Example 10 (Polyurethane Resin solution (G): 1,4-BIC-Based PU Solution)

In a nitrogen atmosphere, a reactor equipped with an anchor blade, thermometer, and water-cooling condenser, and capable of continuously measuring mixing torque was charged with 146.6 parts by mass of PTG-2000SN (polytetramethylene ether glycol with number average molecular weight 2000, manufactured by Hodogaya Chemical Co., LTD.) that was subjected to dehydration process under reduced pressure in advance and 42.7 parts by mass of 1,4-BIC produced in Production Example 9, and the temperature was increased to 80° C. with a stirring speed of 200 rpm.

Then, after reaction was caused at 80° C. for 1 hour, 0.004 parts by mass of stannous octoate (Stanoct) was added as a catalyst in advance. After reaction was caused at the same temperature for further 2 hours, reaction was caused until the isocyanate group concentration was 6.5 mass %, thereby producing isocyanate group-terminated urethane prepolymer (g).

Then, the isocyanate group-terminated urethane prepolymer (g) was cooled to 50° C., and thereafter, 772 parts by mass of DMF, which was dehydrated in advance by immersion of molecular sieves 4A, was gradually added with a stirring speed of 300 rpm so that the isocyanate group-terminated urethane prepolymer (g) concentration was 20 mass %, thereby dissolving the isocyanate group-terminated urethane prepolymer (g).

Thereafter, the temperature of the DMF solution of isocyanate group-terminated methane prepolymer (g) was increased again to 80° C. or less. 20.7 parts by mass of ethylene glycol (EG) (manufactured by Wako Pure Chemical Industries, Ltd. special grade) diluted with DMF to 40 mass % and 0.15 parts by mass of stannous octoate were added. After reaction was caused at 80° C. for 6 hours, 2.3 parts by mass of EG diluted with DMF to 40 mass % was added. Reaction was further caused at 80° C. for 1 hour.

Furthermore, 6.1 parts by mass (solid content 0.61 parts by mass) of IRGANOX 245 (manufactured by BASF heat-resistant stabilizer), 5.1 parts by mass (solid content 0.51 parts by mass) of TINUVIN 234 (manufactured by BASF HALS), and 3.0 parts by mass (solid content 0.30 parts by mass) of ADK STABLA-72 (manufactured by ADEKA ultraviolet ray absorber) all of which dissolved with DMF to 10 mass % were added, thereby producing polyurethane resin solution (G). the polyurethane resin had a solid content concentration of 20 mass %, and a viscosity measured at 25° C. of 25,000 mPa·s.

Production Example 11 (Polyurethane Resin Solution (H): IPDI-Based PU Solution (Prepolymer Method)

In a nitrogen atmosphere, a reactor equipped with an anchor blade, thermometer, and water-cooling condenser, and capable of continuously measuring mixing torque was charged with 145.6 parts by mass of PTG-2000SN (polytetramethylene ether glycol with number average molecular weight 2000, manufactured by Hodogaya Chemical Co., LTD.) that was subjected to dehydration process under reduced pressure in advance and 48.9 parts by mass of isophoron diisocyanate (VESTANAT IPDI manufactured by Evonic Corporation), and the temperature was increased to 80° C. with a stirring speed of 200 rpm.

Then, after reaction was caused at 80° C. for 1 hour, 0.004 parts by mass of stannous octoate (Stanoct) was added as a catalyst in advance.

After reaction was caused at the same temperature for further 2 hours, reaction was caused until the isocyanate group concentration was 6.3 mass %, thereby producing isocyanate group-terminated urethane prepolymer (h).

Then, the isocyanate group-terminated urethane prepolymer (h) was cooled to 50° C., and thereafter 782 parts by mass of DMF, which was dehydrated in advance by immersion of molecular sieves 4A, was gradually added with a stirring speed of 300 rpm so that the isocyanate group-terminated urethane prepolymer (h) concentration was 20 mass %, thereby dissolving the isocyanate group-terminated urethane prepolymer (h).

Thereafter, the temperature of the DMF solution of the isocyanate group-terminated urethane prepolymer (h) was increased again to 80° C. or less. 20.2 parts by mass of ethylene glycol (EG) (manufactured by Wako Pure Chemical Industries, Ltd. special grade) diluted with DMF to 40 mass % and 0.15 parts by mass of stannous octoate were added. After reaction was caused at 80° C. for 6 hours, 2.3 parts by mass of EG Diluted with DMF to 40 mass % was added. Reaction was further caused at 80° C. for 1 hour.

Furthermore, 6.1 parts by mass (solid content 0.61 parts by mass) of IRGANOX 245 (manufactured by BASF heat-resistant stabilizer), 5.1 parts by mass (solid content 0.51 parts by mass) of TINUVIN 234 (manufactured by BASF HALS), and 3.0 parts by mass (solid content 0.30 parts by mass) of ADK STABLA-72 (manufactured by ADEKA ultraviolet ray absorber), all of which dissolved with DMF to 10 mass %, were added, thereby producing polyurethane resin solution (H). The polyurethane resin had a solid content concentration of 20 mass %, and a viscosity measured at 25° C. of 17,000 mPa·s.

Production Example 12 (Polyurethane Resin Solution (I): H$^{12}$MDI-Based PU Solution)

In a nitrogen atmosphere, a reactor equipped with an anchor blade, thermometer, and water-cooling condenser, and capable of continuously measuring mixing torque was charged with 140.4 parts by mass of PTG-2000SN (polytetramethylene ether glycol with number average molecular weight 2000, manufactured by Hodogaya Chemical Co., LTD.) that was subjected to dehydration process under reduced pressure in advance and 55.3 parts by mass of dicyclohexylmethane 4,4'-diisocyanate (VESTANAT H$^{12}$MDI manufactured by Evonic Corporation), and the temperature was increased to 80° C. with a stirring speed of 200 rpm.

Then, after reaction was caused at 80° C. for 1 hour, 0.004 parts by mass of stannous octoate (Stanoct) was added as a catalyst in advance. After reaction was caused at the same temperature for further 2 hours, reaction was caused until the isocyanate group concentration was 6.0 mass %, thereby producing isocyanate group-terminated urethane prepolymer (i).

Then, isocyanate group-terminated urethane prepolymer was cooled to 50° C., and thereafter 782 parts by mass of DMF, which was dehydrated in advance by immersion of molecular sieves 4A, was gradually added with a stirring speed of 300 rpm so that the isocyanate group-terminated urethane prepolymer (i) concentration was 20 mass %, thereby dissolving the isocyanate group-terminated urethane prepolymer (i).

Thereafter, the temperature of the DMF solution of isocyanate group-terminated methane prepolymer (i) was increased again to 80° C. or less. 20.3 parts by mass of ethylene glycol (EG) (manufactured by Wako Pure Chemical Industries, Ltd. special grade) diluted with DMF to 40 mass % and 0.15 parts by mass of stannous octoate were added. After reaction was caused at 80° C. for 6 hours, 2.3 parts by mass of EG diluted with DMF to 40 mass % was added. Reaction was further caused at 80° C. for 1 hour.

Furthermore, 6.1 parts by mass (solid content 0.61 parts by mass) of IRGANOX 245 (manufactured by BASF heat-resistant stabilizer), 5.1 parts by mass (solid content 0.51 parts by mass) of TINUVIN 234 (manufactured by BASF HALS), and 3.0 parts by mass (solid content 0.30 parts by mass) of ADK STABLA-72 (manufactured by ADEKA ultraviolet ray absorber), all of which dissolved with DMF to 10 mass %, were added, thereby producing polyurethane resin solution (I). The polyurethane resin had a solid content concentration of 20 mass %, and a viscosity measured at 25° C. of 22,000 mPa·s.

Production Example 13 (Polyurethane Resin Solution (J): IPDI-Based PU Solution (One Shot Process))

In a nitrogen atmosphere, a reactor equipped with an anchor blade, thermometer, and water-cooling condenser, and capable of continuously measuring mixing torque was charged with 145.6 parts by mass of PTG-2000SN (polytetramethylene ether glycol with number average molecular weight 2000, manufactured by Hodogaya Chemical Co., LTD.) that was subjected to dehydration process in advance under reduced pressure, and 48.9 parts by mass of isophoron diisocyanate (VESTANAT IPDI manufactured by Evonic Corporation), 307 parts by mass of DMF, which was dehydrated in advance by immersion of molecular sieves 4A, and 8.8 parts by mass of ethylene glycol, and the temperature was increased to 80° C. with a stirring speed of 200 rpm. Then, after reaction was caused at 80° C. for 1 hours, 0.20 parts by mass of stannous octoate (Stanoct) was added as a catalyst, in advance.

After reaction was caused at the same temperature for further 10 hours, 489 parts by mass of DMF was added so that the polyurethane resin concentration was 20 mass %.

Furthermore, 6.1 parts by mass (solid content 0.61 parts by mass) of IRGANOX 245 (manufactured by BASF heat-resistant stabilizer), 5.1 parts by mass (solid content 0.51 parts by mass) of TINUVIN 234 (manufactured by BASF HALS), and 3.0 parts by mass (solid content 0.30 parts by mass) of ADK STABLA-72 (manufactured by ADEKA ultraviolet ray absorber), all of which dissolved with DMF to 10 mass %, were added, thereby producing polyurethane resin solution (J). The polyurethane resin had a solid content concentration of 20 mass %, and a viscosity measured at 25° C. of 12,000 mPa·s.

Production Example 14 (Polyurethane Resin Solution (K): 1,4-BIC-Based PU Solution (Polyurethane Urea))

In a nitrogen atmosphere, a reactor equipped with an anchor blade, thermometer, and water-cooling condenser, and capable of continuously measuring mixing torque was charged with 130.7 parts by mass of PTG 2000SN that was subjected to dehydration process under reduced pressure in advance, and 19.0 parts by mass of 1,4-BIC produced in Production Example 9, and the temperature was increased to 60° C. with a stirring speed of 200 rpm.

Then, after reaction was caused at 80° C. for 1 hour, 0.004 parts by mass of stannous octoate (Stanoct) was added as a catalyst.

Reaction was caused at the same temperature until the isocyanate group concentration was 1.83 mass %, thereby producing isocyanate group-terminated urethane prepolymer (k).

Then, the isocyanate group-terminated urethane prepolymer (k) was cooled to 50° C., and thereafter with a stirring speed of 300 rpm, 829 parts by mass of DMF, in which molecular sieves 4A were immersed in advance, was gradually added so that the isocyanate group-terminated urethane prepolymer (k) concentration was 15.3 mass %, thereby dissolving the isocyanate group-terminated urethane prepolymer (k).

Thereafter, the DMF solution of isocyanate group-terminated urethane prepolymer (k) was cooled to 15° C. or less. A 10 mass % DMF solution of amine mixture of 1.57 parts by mass of ethylenediamine (manufactured by Wako Pure Chemical Industries, Ltd.), 0.49 parts by mass of 1,2-propane diamine (manufactured by Wako Pure Chemical Industries, Ltd.), and 0.48 parts by mass of diethylamine (manufactured by Wako Pure Chemical Industries, Ltd.) was dropped so as not to increase the temperature to more than 30° C., and thereafter the temperature was increased to 50° C., and chain extension reaction was caused at the same temperature for 1 hour.

Furthermore, 6.1 parts by mass (solid content 0.61 parts by mass) of IRGANOX 245 (manufactured by BASF heat-resistant stabilizer), 5.1 parts by mass (solid content 0.51 parts by mass) of TINUVIN 234 (manufactured by BASF HALS), and 3.0 parts by mass (solid content 0.30 parts by mass) of ADK STABLA-72 (manufactured by ADEKA ultraviolet ray absorber) all of which dissolved with DMF to 10 mass % were added, thereby producing polyurethane resin solution (K). The polyurethane resin solution (K) had a solid content concentration of 15.2 mass %, and a viscosity measured at 25° C. of 47000 mPa·s.

Example 1

The polyurethane resin solution (G) prepared in Production Example 10 was applied in advance on the surfaces of a sheet mold having a thickness of 2 mm and a 5 cm square block mold having a thickness of 15 mm using an applicator uniformly to give a thickness of about 0.1 mm. Then, the solvent was volatilized for about 1 hour in an oven having a temperature of 80° C. under nitrogen flow, thereby forming a uniform polyurethane film (coat layer) of about 20 μm.

Thereafter, a stainless steel vessel was charged with 91.9 parts by mass of amorphous polytetramethylene ether glycol (manufactured by Asahi Kasei Fibers Corporation, trade name: PTXG-1800) with its temperature adjusted to 80° C., 8.1 parts by mass (equivalent ratio of isocyanate group to hydroxyl group (NCO/hydroxyl group)=0.49) of aliphatic polyisocyanate (A) produced in Production Example 2, 0.3 parts by mass of IRGANOX 245 (manufactured by BASF heat-resistant stabilizer), 0.15 parts by mass of TINUVIN 234 (manufactured by BASF, HALS), 0.15 parts by mass of ADK STAB LA-72 (manufactured by ADEKA, ultraviolet ray absorber), 0.01 parts by mass of catalyst, dibutyltin (IV) dilaurate (manufactured by Wako Pure Chemical Industries, Ltd.), and 0.01 parts by mass of an antifoaming agent (manufactured by BYK additives and instruments, trade name: BYK-088) and the mixture was stirred for 1 minute at 700 rpm using a three-one motor (manufactured by Shinto Scientific Co., Ltd., trade name: HEIDOM FBL 3000). Thereafter, the pressure was immediately reduced to defoam to remove the bubbles in the mixture liquid, and then the mixture liquid was poured with care not to include bubbles in the molds (in which the coat layer was already formed) whose temperature was adjusted to 80° C. Reaction was caused at 80° C. for 2 hours, thereby forming a gel layer.

Thereafter, the produced molded article was removed from the mold, and the polyurethane resin solution G was applied with a brush on the surface (exposed surface) where the coat layer was not formed, and dried at 80° C. under nitrogen for about 1 hours, thereby forming the coat layer. The polyurethane gel (A) was produced in this manner.

The polyurethane gel (A) was allowed to stand in a room of 23° C. and relative humidity 55% for 7 days, and thereafter, subjected to various physical property measurements.

Examples 2 to 4, 8 to 15, 19 to 22, and Comparative Examples 1 to 3

Polyurethane gels (B) to (D), (H) to (O), (P) to (R), (Z), (AA) to (AC) were produced in the same manner as in Example 1, except that the formulation shown in Tables 1 to 3 was used.

Example 5

Addition polymerization of propylene oxide to dipropylene glycol was performed with the method described in Example 2 of Patent Publication No. 3905638, using a phosphazenium compound as the catalyst, thereby producing polyoxypropylene glycol having a hydroxyl number of 31.2 mgKOH/g.

Then, polyurethane gel (E) was produced in the same manner as in Example 1, except that the produced polyoxypropylene glycol and amorphous polytetramethylene ether glycol (manufactured by Asahi Kasei Fibers Corporation, trade name: PTXG-1800) were used, the formulation was changed in accordance with Tables 1 to 3, and curing conditions for the gel layer were changed to 80° C. 5 hours.

Examples 6 and 7

Polyurethane gels (F) and (G) were produced in the same manner as in Example 1, except that the formulation shown in Tables 1 to 3 was used, and the curing conditions for the gel layer were changed to 50° C. 2 hours.

Example 16

Polyurethane gel (U) was produced in the same manner as in Example 2, except that the polyurethane resin solution (G) was applied uniformly to the mold to give a thickness of about 1 mm, and the solvent was volatilized in an oven having a temperature of 80° C. under nitrogen flow for about 1 hour, thereby forming a uniform polyurethane film (coat layer) of about 200 μm.

Example 17

Polyurethane gel (V) was produced in the same manner as in Example 2, except that the polyurethane resin solution (G) was applied uniformly to the mold to give a thickness of about 2.5 mm, and the solvent was volatilized in an oven having a temperature of 80° C. under nitrogen flow for about 1 hour, thereby forming a uniform polyurethane film (coat layer) of about 500 μm.

Example 18

Polyurethane gel (W) was produced in the same manner as in Example 13, except that the polyurethane resin solution (G) was applied uniformly to the mold to give a thickness of about 1 mm, and the solvent was volatilized in an oven having a temperature of 80° C. under nitrogen flow for about 1 hour, thereby forming a uniform polyurethane film of about 200 μm.

Comparative Example 4

Polyurethane gel (S) was produced in the same manner as in Example 2, except that the polyurethane resin solution (F) was not applied to the mold, and the coat layer was not formed.

Comparative Example 5

Polyurethane gel (T) was produced in the same manner as in Comparative Example 1, except that a composition in which 100 parts by mass of ACTCOL T-3000 (oxypropylenetriol having a molecular weight of 3000, manufactured by Mitsui Chemicals, Inc.), 11.3 parts by mass of isophoron diisocyanate (VESTANAT IPDI, manufactured by Evonic Corporation), 0.05 parts by mass of triethylenediamine, and 0.01 parts by mass of an antifoaming agent (manufactured by BYK additives and instruments, trade name: BYK-088) were mixed was used instead of the polyurethane resin solution (J), the mixture composition was applied uniformly to the surfaces of a sheet mold having a thickness of 2 mm and a 5 cm square block mold having a thickness of 15 mm to give a thickness of about 20 μm in advance using an applicator, and reaction was caused in an oven having a temperature of 80° C. under nitrogen flow for 30 minutes, thereby forming a uniform polyurethane film (coat layer).

Comparative Example 6

Polyurethane gel (X) was produced in the same manner as in Comparative Example 1, except that the polyurethane resin solution (J) was applied uniformly to give a thickness of about 1 mm, and the solvent was volatilized in an oven having a temperature of 80° C. under nitrogen flow for about 1 hour, thereby forming a uniform polyurethane film (coat layer) of about 200 μm.

Comparative Example 7

Polyurethane gel (Y) was produced in the same manner as in Comparative Example 5, except that a mixture composition was applied uniformly in advance to surfaces of a sheet mold having a thickness of 2 mm and 5 cm square block mold having a thickness of 15 mm to give a thickness of about 200 μm, and reaction was caused in an oven having a temperature of 80° C. under nitrogen flow for 30 minutes, thereby forming a uniform polyurethane film.

<<Evaluation>>
<Hardness (Unit: C)>
The hardness of the polyurethane gel produced with the block mold was measured in accordance with type C hardness test of JIS K 7312 (1996).
<Tack Evaluation>
The polyurethane gel produced with the block mold was placed on a polypropylene plate (PP plate), and allowed to stand in a room having a temperature of 23° C. and a relative humidity of 55% for 1 day.
Then, the PP plate was turned upside down, and tack properties were evaluated based on how they were dropped.
Evaluation criteria are shown below.
5: the polyurethane gel started slipping while turning the plate upside down, and dropped.
4: dropped at the moment the plate was turned upside down.
3: the polyurethane gel stayed for a few seconds after the plate was turned upside down, and then dropped.
2: the polyurethane gel stayed for 1 minute or more after the plate was turned upside down, and then dropped.
1: the polyurethane gel stayed for 5 minutes or more.
<Texture Evaluation>
The center of the polyurethane gel (5 cm square, 15 mm thickness) produced with the block mold was compressed for 25% using a cylindrical rod having a diameter of 3 cm at room temperature. After compression for 10 minutes, the time after releasing till restoring to the original state was measured. The shorter the time, the polyurethane gel was evaluated as having softness and elasticity like human skin.
Evaluation criteria are shown below.
5: within 10 seconds
4: within 30 seconds (longer than 10 seconds)
3: within 1 minute (longer than 30 seconds)
2: within 5 minutes (longer than 1 minute)
1: longer than 5 minutes Deformed: higher tackiness, adhered to the cylinder rod, deformed at the lime of removal and unable to evaluate.
<Appearance>
Appearance (transparency) of the polyurethane gel was evaluated visually.
<Breaking Strength (Unit: kPa)>
The polyurethane gel produced with the sheet mold was punched out with a JIS-3 dumbbell.
Then, using a tensile tester (manufactured by A&D Company, Limited, model: RTG-1310), tensile test was performed under conditions of the following: atmosphere of 23° C. and relative humidity 55%, tensile speed 300 mm/min, distance between chucks 20 mm. Tensile strength was measured in this manner.
<Elongation at Break (Unit: %)>
Tensile test was performed under the same conditions as the conditions for the Breaking strength, and Elongation at break was measured.
<Tear Strength (Unit: kN/m)>
The polyurethane gel produced with the sheet mold was punched out with a JIS-B type dumbbell. Then, tensile test was performed under the same conditions as the conditions for the Breaking strength, and tear strength was measured.
<Heat Resistant Test>
The polyurethane gels were stored at 100° C. for 10 days, thereby exposing them to heat.
Thereafter, appearance was checked visually, and texture and tackiness were evaluated based on the above-described method.
The Breaking strength, Elongation at break, and tear strength were measured based on the above-described method, and the retention rate was determined based on the following formula.

Retention rate (%)=(physical property values after heat exposure/physical property values before heat exposure)×100

TABLE 1

| | | | | Example 1 | Example 2 | Example 3 | Example 4 | Example 5 |
|---|---|---|---|---|---|---|---|---|
| | | Polyurethane gel | | A | B | C | D | E |
| Gel layer formulation (equivalent ratio) | Polyisocyanate | Aliphatic Polyisocyanate(A) | Production Example 2 | 0.49 | — | — | — | — |
| | | Aliphatic Polyisocyanate(B) | Production Example 3 | — | 0.51 | 0.51 | 0.53 | 0.54 |
| | | Aliphatic Polyisocyanate(C) | Production Example 4 | — | — | — | — | — |
| | | Aliphatic Polyisocyanate(E1) | Production Example 6 | — | — | — | — | — |
| | | Aliphatic Polyisocyanate(E2) | Production Example 7 | — | — | — | — | — |
| | | HDI trimer | D-170N | — | — | — | — | — |
| | | IPDI monomer | — | — | — | — | — | — |
| | | HDI monomer | — | — | — | — | — | — |
| | | Functionality | | 3.1 | 3.1 | 3.1 | 3.1 | 3.1 |
| | Polyol | Amorphous polytetramethylene ether glycol | PTXG | 1 | 1 | 1 | 1 | 0.97 |
| | | Trifunctional polyoxyalkylene polyol | EP-505S | — | — | — | — | — |
| | | Polyoxyethylenemonomethylether | M-550 | — | — | — | — | — |
| | | Bifunctional polyoxyalkylene polyol | ED-26 | — | — | — | — | — |
| | | Polyoxyalkylene glycol A | — | — | — | — | — | 0.03 |
| | | Trifunctional polyoxypropylenetriol | T-3000 | — | — | — | — | — |
| Coat layer | | Polyurethane resin solution | | G | F | G | G | G |
| Evaluation | | Hardness(C) | | 1 | 1 | 1 | 10 | 15 |
| | | Texture evaluation | | 5 | 4 | 5 | 5 | 4 |
| | | Appearance | | Transparent | Transparent | Transparent | Transparent | Transparent |
| | | Tackiness | | 5 | 5 | 5 | 5 | 5 |
| | | Breaking strength(kPa) | | 1150 | 880 | 1250 | 1450 | 1630 |

TABLE 1-continued

|  |  |  |  | | | | | |
|---|---|---|---|---|---|---|---|---|
|  |  | Elongation at break(%) |  | 650 | 520 | 620 | 550 | 410 |
|  |  | Tear strength(kN/m) |  | 2 | 1.5 | 2.4 | 2.9 | 3.1 |
|  | Heat-resistant test | Texture evaluation |  | 5 | 4 | 5 | 5 | 4 |
|  |  | Appearance changes |  | None | Slightly white | None | None | None |
|  |  | Tackiness |  | 5 | 5 | 5 | 5 | 5 |
|  |  | Breaking strength retention rate(%) |  | 92 | 88 | 93 | 95 | 96 |
|  |  | Elongation at break retention rate(%) |  | 97 | 93 | 99 | 99 | 98 |
|  |  | Tear strength retention rate(%) |  | 95 | 88 | 95 | 97 | 97 |

|  |  |  |  | No. | | | | |
|---|---|---|---|---|---|---|---|---|
|  |  |  |  | Example 6 | Example 7 | Example 8 | Example 9 | Example 10 |
| Gel layer formulation (equivalent ratio) |  | Polyurethane gel |  | F | G | H | I | J |
|  | Polyisocyanate | Aliphatic Polyisocyanate(A) | Production Example 2 | — | — | — | — | — |
|  |  | Aliphatic Polyisocyanate(B) | Production Example 3 | 0.61 | 0.65 | 0.51 | 0.51 | 0.51 |
|  |  | Aliphatic Polyisocyanate(C) | Production Example 4 | — | — | — | — | — |
|  |  | Aliphatic Polyisocyanate(E1) | Production Example 6 | — | — | — | — | — |
|  |  | Aliphatic Polyisocyanate(E2) | Production Example 7 | — | — | — | — | — |
|  |  | HDI trimer | D-170N | — | — | — | — | — |
|  |  | IPDI monomer | — | — | — | — | — | — |
|  |  | HDI monomer | — | — | — | — | — | — |
|  |  | Functionality |  | 3.1 | 3.1 | 3.1 | 3.1 | 3.1 |
|  | Polyol | Amorphous polytetramethylene ether glycol | PTXG | 0.80 | 0.80 | 1 | 1 | 1 |
|  |  | Trifunctional polyoxyalkylene polyol | EP-505S | 0.05 | 0.05 | — | — | — |
|  |  | Polyoxyethylenemonomethylether | M-550 | 0.15 | 0.15 | — | — | — |
|  |  | Bifunctional polyoxyalkylene polyol | ED-26 | — | — | — | — | — |
|  |  | Polyoxyalkylene glycol A | — | — | — | — | — | — |
|  |  | Trifunctional polyoxypropylenetriol | T-3000 | — | — | — | — | — |
| Coat layer |  | Polyurethane resin solution |  | G | G | H | I | J |
| Evaluation |  | Hardness(C) |  | 1 | 10 | 1 | 1 | 1 |
|  |  | Texture evaluation |  | 5 | 5 | 5 | 5 | 5 |
|  |  | Appearance |  | Transparent | Transparent | Transparent | Transparent | Transparent |
|  |  | Tackiness |  | 5 | 5 | 5 | 4 | 4 |
|  |  | Breaking strength(kPa) |  | 900 | 1050 | 920 | 820 | 850 |
|  |  | Elongation at break(%) |  | 850 | 730 | 480 | 510 | 380 |
|  |  | Tear strength(kN/m) |  | 1.8 | 2.7 | 1.6 | 1.8 | 1.2 |
|  | Heat-resistant test | Texture evaluation |  | 5 | 5 | 4 | 4 | Deformed |
|  |  | Appearance changes |  | None | None | None | None | None |
|  |  | Tackiness |  | 5 | 5 | 4 | 4 | 3 |
|  |  | Breaking strength retention rate(%) |  | 92 | 96 | 78 | 82 | 76 |
|  |  | Elongation at break retention rate(%) |  | 95 | 98 | 90 | 95 | 91 |
|  |  | Tear strength retention rate(%) |  | 93 | 96 | 80 | 82 | 78 |

TABLE 2

| | | | No. | | | | | | | | | | |
|---|---|---|---|---|---|---|---|---|---|---|---|---|---|
| | | | Example 11 | Example 12 | Example 13 | Example 14 | Example 15 | Example 19 | Example 20 | Example 21 | Example 22 | |
| Gel layer formulation (equivalent ratio) | Polyurethane gel | | K | L | M | N | O | Z | AA | AB | AC | |
| | Polyisocyanate | Aliphatic Polyisocyanate(A) Production Example 2 | — | — | — | — | — | — | — | — | — | |
| | | Aliphatic Polyisocyanate(B) Production Example 3 | — | — | — | 0.51 | 0.51 | — | — | — | — | |
| | | Aliphatic Polyisocyanate(C) Production Example 4 | 0.53 | — | — | — | — | — | 0.65 | — | — | |
| | | Aliphatic Polyisocyanate(E1) Production Example 6 | — | 0.51 | — | — | — | 0.60 | — | 0.67 | — | |
| | | Aliphatic Polyisocyanate(E2) Production Example 7 | — | — | — | — | — | — | — | — | 0.70 | |
| | | HDI trimer D-170N | — | — | 0.48 | — | — | — | — | — | — | |
| | | IPDI monomer | — | — | — | — | — | — | — | — | — | |
| | | HDI monomer | — | — | — | — | — | — | — | — | — | |
| | | Functionality | 2.8 | 2.9 | 3.4 | 3.1 | 3.1 | 2.8 | 2.8 | 2.9 | 2.5 | |
| | | | 1 | 1 | 1 | 1 | 1 | 1 | 1 | 1 | 1 | |
| | Polyol | Amorphous polytetramethylene ether glycol PTXG | — | — | — | — | — | — | — | — | — | |
| | | Trifunctional polyoxyalkylene polyol EP-505S | — | — | — | 1 | — | — | — | — | — | |
| | | Polyoxyethylenemonomethylether M-550 | — | — | — | — | — | — | — | — | — | |
| | | Bifunctional polyoxyalkylene polyol ED-26 | — | — | — | — | — | — | — | — | — | |
| | | Polyoxyalkylene glycol A | — | — | — | — | — | — | — | — | — | |
| | | Trifunctional polyoxypropylenetriol T-3000 | — | — | — | — | — | — | — | — | — | |
| Coat layer | | Polyurethane resin solution | G | G | G | G | K | G | G | G | G | |
| Evaluation | | Hardness(C) | 1 | 1 | 1 | 5 | 1 | 10 | 20 | 20 | 20 | |
| | | Texture evaluation | 5 | 5 | 5 | 4 | 5 | 5 | 5 | 5 | 5 | |
| | | Appearance | Transparent | Transparent | Non-transparent | Transparent | Transparent | Transparent | Transparent | Transparent | Transparent | |
| | | Tackiness | 5 | 5 | 5 | 5 | 5 | 5 | 5 | 5 | 5 | |
| | | Breaking strength(kPa) | 1090 | 1070 | 980 | 1080 | 1420 | 1250 | 1250 | 1200 | 1120 | |
| | | Elongation at break(%) | 670 | 720 | 550 | 380 | 580 | 610 | 610 | 600 | 590 | |
| | | Tear strength(kN/m) | 2.1 | 1.9 | 2 | 1.4 | 2.8 | 2.6 | 2.6 | 2.2 | 2 | |
| | | Texture evaluation | 4 | 4 | 4 | 3 | 5 | 5 | 5 | 5 | 5 | |
| | Heat-resistant test | Appearance changes | None | None | None | None | None | None | None | None | None | |
| | | Tackiness | 5 | 5 | 5 | 5 | 5 | 5 | 5 | 5 | 5 | |
| | | Breaking strength retention rate(%) | 91 | 92 | 85 | 94 | 97 | 95 | 95 | 93 | 90 | |
| | | Elongation at break retention rate(%) | 99 | 98 | 95 | 95 | 99 | 99 | 99 | 98 | 94 | |
| | | Tear strength retention rate(%) | 93 | 93 | 88 | 92 | 97 | 97 | 97 | 94 | 92 | |

TABLE 3

| | | | | Comp. Ex. 1 | Comp. Ex. 2 | Comp. Ex. 3 | Comp. Ex. 4 | Comp. Ex. 5 |
|---|---|---|---|---|---|---|---|---|
| | | Polyurethane gel | | P | Q | R | S | T |
| Gel layer formulation (equivalent ratio) | Polyisocyanate | Aliphatic Polyisocyanate(A) | Production Example 2 | — | — | — | — | — |
| | | Aliphatic Polyisocyanate(B) | Production Example 3 | — | — | — | 0.51 | — |
| | | Aliphatic Polyisocyanate(C) | Production Example 4 | — | — | — | — | — |
| | | Aliphatic Polyisocyanate(E1) | Production Example 6 | — | — | — | — | — |
| | | Aliphatic Polyisocyanate(E2) | Production Example 7 | — | — | — | — | — |
| | | HDI trimer | D-170N | — | — | — | — | — |
| | | IPDI monomer | — | 0.63 | 0.63 | — | — | 0.63 |
| | | HDI monomer | — | — | — | 0.60 | — | — |
| | | Functionality | | 2.0 | 2.0 | 2.0 | 3.1 | 2.0 |
| | Polyol | Amorphous polytetramethylene ether glycol | PTXG | — | — | — | 1 | — |
| | | Trifunctional polyoxyalkylene polyol | EP-505S | — | — | 1 | — | — |
| | | Polyoxyethylenemonomethylether | M-550 | — | — | — | — | — |
| | | Bifunctional polyoxyalkylene polyol | ED-26 | — | — | — | — | — |
| | | Polyoxyalkylene glycol A | — | — | — | — | — | — |
| | | Trifunctional polyoxypropylenetriol | T-3000 | 1 | 1 | — | — | 1 |
| Coat layer | | Polyurethane resin solution | | J | G | G | None | IPDI/T-3000 |
| Evaluation | | Hardness(C) | | 3 | 3 | 1 | 1 | 3 |
| | | Texture evaluation | | 3 | 3 | 3 | Deformed | 3 |
| | | Appearance | | Transparent | Transparent | Non-transparent | Transparent | Transparent |
| | | Tackiness | | 4 | 4 | 4 | 1 | 1 |
| | | Breaking strength(kPa) | | 380 | 450 | 470 | 950 | 360 |
| | | Elongation at break(%) | | 220 | 330 | 380 | 1000 | 240 |
| | | Tear strength(kN/m) | | 0.5 | 0.8 | 0.9 | 2.1 | 0.5 |
| | Heat-resistant test | Texture evaluation | | Deformed | Deformed | Deformed | Deformed | Deformed |
| | | Appearance changes | | Whitened | Slightly white | None | None | None |
| | | Tackiness | | 1 | 2 | 2 | 1 | 1 |
| | | Breaking strength retention rate(%) | | 48 | 52 | 80 | 90 | 50 |
| | | Elongation at break retention rate(%) | | 82 | 88 | 95 | 98 | 82 |
| | | Tear strength retention rate(%) | | 58 | 58 | 88 | 92 | 55 |

TABLE 4

| | | | | Example 3 | Example 16 | Example 17 | Example 13 | Example 18 |
|---|---|---|---|---|---|---|---|---|
| | | Polyurethane gel | | C | U | V | M | W |
| Gel layer formulation (equivalent ratio) | Polyisocyanate | Aliphatic Polyisocyanate (B) | Production Example 3 | 0.51 | 0.51 | 0.51 | — | — |
| | | HDI trimer | D-170N | — | — | — | 0.48 | 0.48 |
| | | IPDI monomer | — | — | — | — | — | — |
| | | Functionality | | 3.1 | 3.1 | 3.1 | 3.4 | 3.4 |
| | Polyol | Amorphous polytetramethylene ether glycol | PTXG | 1 | 1 | 1 | 1 | 1 |
| | | Trifunctional polyoxyalkylene polyol | T-3000 | — | — | — | — | — |
| Coat layer | | Polyurethane resin solution | | G | G | G | G | G |
| | | Thickness μm | | 20 | 200 | 500 | 20 | 200 |
| Evaluation | | Hardness(C) | | 1 | 1 | 1 | 1 | 2 |
| | | Texture evaluation | | 5 | 5 | 4 | 5 | 4 |
| | | Appearance | | Transparent | Transparent | Transparent | Non-transparent | Non-transparent |
| | | Tackiness | | 5 | 5 | 5 | 5 | 5 |
| | | Elongation at break(%) | | 620 | 550 | 380 | 550 | 540 |
| | Heat-resistant test | Texture evaluation | | 5 | 5 | 4 | 4 | 4 |
| | | Appearance changes | | None | None | None | None | None |
| | | Tackiness | | 5 | 5 | 5 | 5 | 5 |

TABLE 4-continued

| | | | | | |
|---|---|---|---|---|---|
| | | Breaking strength retention rate(%) | 99 | 99 | 98 | 95 | 94 |

| | | | | No. | | | |
|---|---|---|---|---|---|---|---|
| | | | | Comp. Ex. 1 | Comp. Ex. 6 | Comp. Ex. 5 | Comp. Ex. 7 |
| Gel layer formulation (equivalent ratio) | Polyisocyanate | Aliphatic Polyisocyanate(B) | Production Example 3 | P | X | T | Y |
| | | HDI trimer | D-170N | — | — | — | — |
| | | IPDI monomer | — | 0.63 | 0.63 | 0.63 | 0.63 |
| | | Functionality | | 2.0 | 2.0 | 2.0 | 2.0 |
| | Polyol | Amorphous polytetramethylene ether glycol | PTXG | — | — | — | — |
| | | Trifunctional polyoxyalkylene polyol | T-3000 | 1 | 1 | 1 | 1 |
| Coat layer | | Polyurethane resin solution | | J | J | IPDI/T-3000 | IPDI/T-3000 |
| | | Thickness | μm | 20 | 200 | 20 | 200 |
| Evaluation | | Hardness(C) | | 3 | 3 | 3 | 3 |
| | | Texture evaluation | | 3 | 2 | 3 | 1 |
| | | Appearance | | Transparent | Transparent | Transparent | Transparent |
| | | Tackiness | | 4 | 5 | 1 | 3 |
| | | Elongation at break(%) | | 220 | 160 | 240 | 120 |
| Heat-resistant test | | Texture evaluation | | Deformed | 1 | Deformed | 1 |
| | | Appearance changes | | Whitened | Whitened | None | None |
| | | Tackiness | | 1 | 3 | 1 | 2 |
| | | Breaking strength retention rate(%) | | 82 | 70 | 82 | 64 |

Abbreviations in Tables are described below.

D-170N: hexamethylenediisocyanate trimer (HDI-based polyisocyanurate derivative), trade name TAKENATE D-170N, isocyanate group concentration 20.7 mass %, manufactured by Mitsui Chemicals, Inc.

PTXG: amorphous polytetramethylene ether glycol, trade name PTXG-1800, manufactured by Asahi Kasei Fibers Corporation, average functionality 2

EP-550S: ethylene oxide-propylene oxide copolymer trifunctional polyoxyalkylene polyol, trade name ACTCOL EP-505S, manufactured by Mitsui Chemicals, Inc., average functionality 3

M-550: polyoxyethylenemonomethylether, trade name UNIOX M-550, manufactured by NOF CORPORATION, average functionality 1

ED-26: ethylene oxide-propylene oxide copolymer bifunctional polyoxyalkylene polyol, ACTCOL ED-26, manufactured by Mitsui Chemicals, Inc., average functionality 2

T-3000: trifunctional polyoxypropylenetriol, trade name ACTCOL T-3000, manufactured by Mitsui Chemicals, Inc., average functionality 3

While the illustrative embodiments of the present invention are provided in the above description, such is for illustrative purpose only and it is not to be construed as limiting. Modification and variation of the present invention that will be obvious to those skilled in the art is to be covered by the following claims.

INDUSTRIAL APPLICABILITY

The Polyurethane gel of the present invention can be suitably used as a vibration isolation-seismic isolation members, shock absorbing members, cushion members, surface protection members, cushioning materials, elbow pads, arm pads, switches, robot members, robot skin, mannequins, mobility members, pads, apparel members, aircrafts members, cosmetics products, medical appliances, caregiving-apparel products such as diapers and bedsore prevention materials, wearable materials, eyewear such as frames, ear and nose pads for eyewear, earphone, headphone, sport members such as grips, toys, playground equipment, protectors such as helmets, furniture, soft sensors, sheets, soft rods, nonwoven fabric, composite material with felt, shoe sole, shoe sore prevention, actuator, human skin gel, and in particular, can be used suitably as a human skin gel, pads, and cushioning materials.

DESCRIPTION OF REFERENCE NUMERALS

1 polyurethane gel
2 gel layer
3 coat layer

The invention claimed is:

1. A polyurethane gel comprising a gel layer and a coat layer covering the gel layer,
   wherein the gel layer is produced by allowing at least aliphatic polyisocyanate having an average functionality of more than 2.0 to react with polyol having an average functionality of 3.0 or less,
   the coat layer is produced by allowing at least aliphatic diisocyanate and/or alicyclic diisocyanate to react with a bifunctional active hydrogen compound, the aliphatic polyisocyanate having an average functionality of more than 2.0 is an isocyanurate derivative of pentamethylene diisocyanate, an isocyanate group concentration of the aliphatic polyisocyanate having an average functionality of more than 2.0 is 20.0 mass % or more and 30.0 mass % or less, the polyol having an average functionality of 3.0 or less contains noncrystalline polytetramethylene ether glycol, the noncrystalline polytetramethylene ether glycol is a copolymer of tetrahydrofuran and branched glycol, the molar ratio of the tetrahydrofuran relative to the branched glycol is 15/85 or more and 85/15 or less, the aliphatic diisocyanate and/or alicyclic diisocyanate includes 1,4-bis(isocyanatomethyl) cyclohexane, and the bifunctional active hydrogen compound includes polytetramethylene ether glycol.

2. The polyurethane gel according to claim 1, wherein the aliphatic polyisocyanate having an average functionality of more than 2.0 has an average functionality of 2.5 or more and 4.0 or less.

3. The polyurethane gel according to claim 1, wherein the aliphatic diisocyanate and/or alicyclic diisocyanate are alicyclic diisocyanate.

4. The polyurethane gel according to claim 3, wherein the alicyclic diisocyanate is bis(isocyanatomethyl) cyclohexane.

5. The polyurethane gel according to claim 1, wherein the polyol having an average functionality of 3.0 or less contains monol.

6. The polyurethane gel according to claim 1, wherein the coat layer has a thickness of 500 μm or less.

7. A method for producing a polyurethane gel, the method comprising:

producing a gel layer by allowing aliphatic polyisocyanate having an average functionality of more than 2.0 to react with polyol having an average functionality of 3.0 or less, and producing a coat layer by allowing aliphatic diisocyanate and/or alicyclic diisocyanate to react with a bifunctional active hydrogen compound, wherein the step of producing a coat layer comprises, producing an isocyanate group-terminated prepolymer by allowing the aliphatic diisocyanate and/or alicyclic diisocyanate to react with a portion of the bifunctional active hydrogen compound so that the equivalent ratio of the isocyanate group in the aliphatic diisocyanate and/or alicyclic diisocyanate relative to the active hydrogen group in the portion of the bifunctional active hydrogen compound is more than 1.0, producing a coat layer by allowing the isocyanate group-terminated prepolymer to react with the remaining portion of the bifunctional active hydrogen compound, the aliphatic polyisocyanate having an average functionality of more than 2.0 is an isocyanurate derivative of pentamethylene diisocyanate, an isocyanate group concentration of the aliphatic polyisocyanate having an average functionality of more than 2.0 is 20.0 mass % or more and 30.0 mass % or less, the polyol having an average functionality of 3.0 or less contains noncrystalline polytetramethylene ether glycol, the noncrystalline polytetramethylene ether glycol is a copolymer of tetrahydrofuran and branched glycol, the molar ratio of the tetrahydrofuran relative to the branched glycol is 15/85 or more and 85/15 or less, the aliphatic diisocyanate and/or alicyclic diisocyanate includes 1,4-bis(isocyanatomethyl) cyclohexane, and the bifunctional active hydrogen compound includes polytetramethylene ether glycol.

8. The polyurethane gel according to claim 1, wherein a number average molecular weight of the noncrystalline polytetramethylene ether glycol is 500 or more and 4000 or less.

* * * * *